(12) United States Patent
Downs et al.

(10) Patent No.: US 10,387,828 B2
(45) Date of Patent: Aug. 20, 2019

(54) ELECTRONIC PRODUCT INFORMATION DISPLAY AND METHOD THEREOF

(71) Applicant: Mobile Price Card, Hampden, ME (US)

(72) Inventors: Kevin Downs, Simsbury, CT (US); Chad O'Leary, Hampden, ME (US)

(73) Assignee: MOBILE PRICE CARD, Hampden, ME (US)

( * ) Notice: Subject to any disclaimer, the term of this patent is extended or adjusted under 35 U.S.C. 154(b) by 580 days.

(21) Appl. No.: 14/939,307

(22) Filed: Nov. 12, 2015

(65) Prior Publication Data
US 2017/0140328 A1    May 18, 2017

(51) Int. Cl.
G06Q 10/00    (2012.01)
G06Q 10/08    (2012.01)
H04W 4/02    (2018.01)

(52) U.S. Cl.
CPC ............ *G06Q 10/087* (2013.01); *H04W 4/02* (2013.01)

(58) Field of Classification Search
CPC ...... G06Q 10/00; G06Q 10/087; G06Q 30/06; G06Q 30/00; G06F 17/00
USPC ................................. 700/232; 705/28, 26.61
See application file for complete search history.

(56) References Cited

U.S. PATENT DOCUMENTS

| | | | | |
|---|---|---|---|---|
| 6,954,735 B1* | 10/2005 | Djupsjobacka | ........ | G06Q 30/06 701/533 |
| 7,873,543 B2* | 1/2011 | Perrier | .............. | G06F 17/30595 705/26.8 |
| 7,966,228 B2* | 6/2011 | Perrier | .............. | G06F 17/30595 705/22 |
| 8,219,558 B1* | 7/2012 | Trandal | ................ | G06Q 10/087 707/736 |
| 8,255,291 B1* | 8/2012 | Nair | ........................ | G06Q 30/02 705/26.64 |
| 8,571,941 B2* | 10/2013 | Perrier | .............. | G06F 17/30595 705/26.1 |
| 8,781,622 B2* | 7/2014 | Mockus | ................. | G06Q 20/18 700/232 |
| 8,831,642 B2* | 9/2014 | Moldavsky | ........ | G06Q 30/0261 455/456.3 |
| 8,833,652 B2* | 9/2014 | Rasband | ........... | G06F 17/30879 235/375 |

(Continued)

OTHER PUBLICATIONS

Notification of Transmittal of the International Search Report for International Application No. PCT/US15/60874 dated Jan. 7, 2016; dated Jan. 11, 2016; 8 pages.

(Continued)

*Primary Examiner* — Oluseye Iwarere
(74) *Attorney, Agent, or Firm* — Cantor Colburn LLP

(57) ABSTRACT

A system and method for displaying product information on the product display. The system including a server positioned at a first location. The server is provided that is configured to receive an input and transmit a data package in response. The input to the server includes product data. A first plurality of mobile devices is positioned at a second location. The second location is different from the first location. The first plurality of mobile devices each has a first display and a second processor. The second processor is responsive to receiving the data package and displaying the product data on the first display in response to receiving the data package.

20 Claims, 19 Drawing Sheets

(56) References Cited

U.S. PATENT DOCUMENTS

| | | | |
|---|---|---|---|
| 9,219,979 B2* | 12/2015 | Moldavsky | G06Q 30/0261 |
| 9,219,980 B2* | 12/2015 | Moldavsky | H04W 4/02 |
| 9,219,981 B2* | 12/2015 | Moldavsky | H04W 4/20 |
| 9,219,990 B2* | 12/2015 | Moldavsky | H04W 4/025 |
| 9,472,043 B2* | 10/2016 | Mockus | G06Q 20/18 |
| 9,628,949 B2* | 4/2017 | Moldavsky | H04W 4/20 |
| 9,674,688 B2* | 6/2017 | Moldavsky | H04W 8/005 |
| 9,679,332 B2* | 6/2017 | Kim | G06Q 30/0254 |
| 9,681,264 B2* | 6/2017 | Moldavsky | H04W 4/025 |
| 9,684,730 B1* | 6/2017 | Grant | G06F 17/30879 |
| 9,693,190 B2* | 6/2017 | Moldavsky | H04W 4/02 |
| 9,747,622 B1* | 8/2017 | Johnson | G06Q 30/0601 |
| 2002/0069293 A1 | 6/2002 | Natalio | |
| 2003/0014275 A1 | 1/2003 | Bearden, III et al. | |
| 2004/0039643 A1 | 2/2004 | McNicol et al. | |
| 2007/0088838 A1 | 4/2007 | Levkovitz et al. | |
| 2009/0204672 A1 | 8/2009 | Jetha et al. | |
| 2010/0063891 A1* | 3/2010 | Townsend | G06Q 30/0222 705/26.1 |
| 2011/0246284 A1* | 10/2011 | Chaikin | G06Q 20/105 705/14.38 |
| 2011/0276385 A1* | 11/2011 | Keller | G06Q 20/202 705/14.38 |
| 2011/0276402 A1* | 11/2011 | Boone | G06Q 10/00 705/14.58 |
| 2012/0029691 A1* | 2/2012 | Mockus | G06Q 20/18 700/232 |
| 2012/0075485 A1* | 3/2012 | Mizutani | H04M 1/7253 348/207.1 |
| 2012/0123675 A1* | 5/2012 | Parker, II | G06Q 30/0222 701/426 |
| 2012/0303484 A1* | 11/2012 | Kim | G06Q 50/01 705/26.61 |
| 2013/0227594 A1* | 8/2013 | Boone | G06Q 20/20 725/5 |
| 2013/0339122 A1* | 12/2013 | Truitt | G06Q 30/0269 705/14.26 |
| 2014/0025495 A1* | 1/2014 | Perrier | G06F 17/30595 705/14.53 |
| 2014/0115492 A1* | 4/2014 | Tehranchi | G06F 9/4443 715/747 |
| 2014/0156346 A1* | 6/2014 | Cai | G06Q 30/0605 705/7.31 |
| 2014/0244447 A1* | 8/2014 | Kim | G06Q 30/0254 705/27.2 |
| 2014/0244488 A1* | 8/2014 | Kim | G06Q 20/02 705/39 |
| 2014/0258051 A1* | 9/2014 | Bostwick | G06Q 20/203 705/28 |
| 2014/0324615 A1* | 10/2014 | Kulkarni | H04W 4/70 705/26.1 |
| 2014/0342760 A1* | 11/2014 | Moldavsky | G06Q 30/0261 455/456.3 |
| 2014/0372254 A1* | 12/2014 | Aragane | G06Q 30/0623 705/26.61 |
| 2015/0005933 A1* | 1/2015 | Mockus | G06Q 20/18 700/232 |
| 2015/0080030 A1* | 3/2015 | Moldavsky | H04W 4/025 455/456.3 |
| 2015/0080031 A1* | 3/2015 | Moldavsky | H04W 4/02 455/456.3 |
| 2015/0080032 A1* | 3/2015 | Moldavsky | H04W 4/20 455/456.3 |
| 2015/0088731 A1* | 3/2015 | Ackerman | G06Q 30/0603 705/39 |
| 2015/0112826 A1* | 4/2015 | Crutchfield, Jr. | G06Q 30/0601 705/26.1 |
| 2015/0120483 A1* | 4/2015 | Ono | G06O 30/08 705/26.3 |
| 2015/0120498 A1* | 4/2015 | Carney | G06Q 30/02 705/26.9 |
| 2015/0206099 A1* | 7/2015 | Bockx | G06F 17/30011 705/343 |
| 2015/0222499 A1* | 8/2015 | Son | H04W 4/21 715/740 |
| 2015/0235258 A1* | 8/2015 | Shah | G06Q 30/0242 705/14.45 |
| 2016/0035012 A1* | 2/2016 | Abell | G06Q 30/0641 705/27.1 |
| 2016/0055562 A1* | 2/2016 | Kim | G06Q 30/0623 705/26.61 |
| 2016/0117500 A1* | 4/2016 | Li | G06F 21/50 726/23 |
| 2016/0119746 A1* | 4/2016 | Moldavsky | H04W 4/20 455/456.3 |
| 2016/0119749 A1* | 4/2016 | Moldavsky | H04W 4/025 455/456.3 |
| 2016/0119750 A1* | 4/2016 | Moldavsky | H04W 4/02 455/456.3 |
| 2016/0119771 A1* | 4/2016 | Moldavsky | G06Q 30/0261 455/456.3 |
| 2016/0217447 A1* | 7/2016 | Sarkar | G06Q 20/201 |
| 2016/0253735 A1* | 9/2016 | Scudillo | G06Q 30/06 705/14.58 |
| 2016/0275545 A1* | 9/2016 | Dasdan | G06Q 30/0244 |
| 2017/0018004 A1* | 1/2017 | Walden | G06Q 30/0261 |
| 2017/0039625 A1* | 2/2017 | Cancro | G06Q 30/0641 |
| 2017/0161728 A1* | 6/2017 | Satyanarayan | G06Q 20/20 |

OTHER PUBLICATIONS

Written Opinion of the International Searching Authority for International Application No. PCT/US15/60874 dated Jan. 7, 2016; dated Jan. 11, 2016; 8 pages.

* cited by examiner

ELECTRONIC PRODUCT INFORMATION DISPLAY AND METHOD THEREOF

BACKGROUND OF THE DISCLOSURE

The subject matter disclosed herein relates to a system for displaying product information on mobile devices, and in particular to, a system for displaying information on a screen of a mobile device that allows for selective and remote updating of the information.

Traditionally, retail establishments used printed paper or cards to display information about products being sold. These display cards would include information about the product, such as price, model number and specifications. Due to size constraints, the amount of information that could be conveyed to the potential customers was limited. Further competing for space on the display card would be any promotional or sales programs that were currently active. When information changes, the retail store would print or receive a new display card and replace the one on the display.

While this system was suitable for many types of products being sold, it creates difficulties in some modern retail, manufacturing and market environments where products are regularly being updated, replaced or obsoleted. For example, some types of businesses, such as electronics stores or cellular phone stores, may rapidly turn over inventory and have multiple promotions being active to sell stock before a new model is released. It should be appreciated that it is difficult to maintain an accurate and up to date display card within the store that includes all of the information that a potential customer may want to know before making a purchase.

Accordingly, while existing product display systems are suitable for their intended purposes the need for improvement remains, particularly in providing a system that eliminates hardcopy product sheets and allows for remote updating of product information.

BRIEF DESCRIPTION OF THE DISCLOSURE

According to one aspect of the disclosure, a system is provided. The system includes a server at a first location. The server includes a first processor responsive to executable computer instructions when executed on the first processor for receiving an input and transmitting a data package in response to receiving the input, the input including product information. The system further includes a first plurality of mobile devices at a second location. The second location being different from the first location. The first plurality of mobile devices has a first display and a second processor, the second processor being coupled to the first display. The second processor is responsive to executable computer instructions for receiving the data package and displaying at least a portion of the product data on the first display in response to receiving the data package.

According to another aspect of the disclosure a method of displaying product information is provided. A method includes inputting a first data set associated with a first mobile device type. A second data set is input that is associated with a second mobile device type. The first data set and the second data set are stored in memory. The first data set and second data set are transmitted to a plurality of mobile devices. The first data set and the second data set are received at a first mobile device, the first mobile device being the first mobile device type. The first data set and the second data set are received at a second mobile device, the second mobile device being the second mobile device type. At least a portion of the first data set is displayed on the first mobile device. At least a portion of the second data set is displayed on the second mobile device.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

Embodiments of the present invention provide advantages in allowing product information to be displayed on the screens of mobile devices within a retail environment and eliminate or reduce the use of hardcopy product display cards. These embodiments provide further advantages in allowing the information displayed on the screens to be remotely and centrally controlled. Embodiments of the present invention provide advantages in automatically collecting information on customer interests in products being sold and allowing the data to be aggregated from multiple retail locations.

Figure 1:
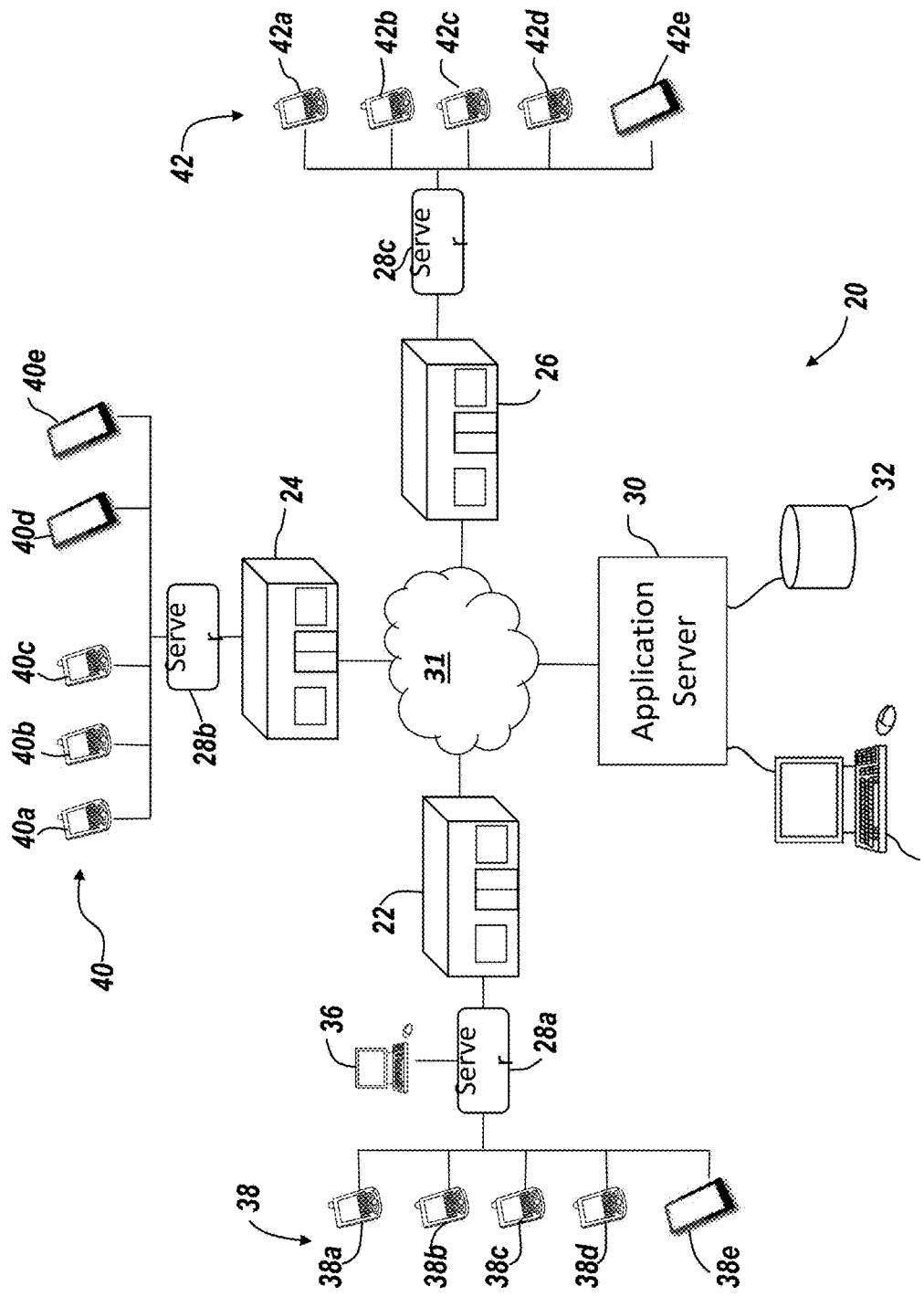
FIG. 1 is a schematic illustration of a system for electronically displaying product information in accordance with an embodiment of the invention.

Referring now to FIG. 1, a system 20 for displaying product information at remotely located mobile devices in a retail environment. The system 20 includes multiple remote locations, such as retail locations 22, 24, 26. Each of these retail locations 22, 24, 26 have at least one, but typically a plurality of mobile devices 38, 40, 42. In one embodiment, the mobile device may be a cellular phone. The term "mobile device" as used herein is not limited to a handheld device and may be any device sized to be carried by a person and is capable of receiving an input (e.g. a touch screen) signal and executing computer instructions in response, such as a computer application. Examples include, but are not limited to, cellular phones, tablet computers, wearable devices (e.g. watches), portable audio/music devices, personal digital assistants and laptop computers.

In one embodiment, the mobile devices 38, 40, 42 may be connected to a communications network 31 through a server 28a, 28b, 28c. Other computing devices, such as point-of-sale (POS) terminals or computers 36 may also be connected to the server 28a, 28b, 28c. The mobile devices 38, 40, 42 are connected to transmit and receive signals and information from a communications network 31. In the exemplary embodiment, the communications network 31 connects the mobile devices 38, 40, 42, the computers 36 and the servers 28a, 28b, 28c to a remote application server 30. The application server 30 may in turn be connected to one or more computing devices, such as but not limited to, a computer terminal 34 and database/storage devices 32. The communications network may be any known type of network, such as but not limited to, a wide area network (WAN), a public switched telephone network (PSTN), a local area network (LAN), a global network (e.g. Internet) and a virtual private network (VPN). The communications network 31 may be implemented using a wireless network or any kind of physical network implementation known in the art.

In one embodiment, the communications network 31 and the application server(s) 30 may be colloquially referred to as "cloud computing." Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

Figure 2:
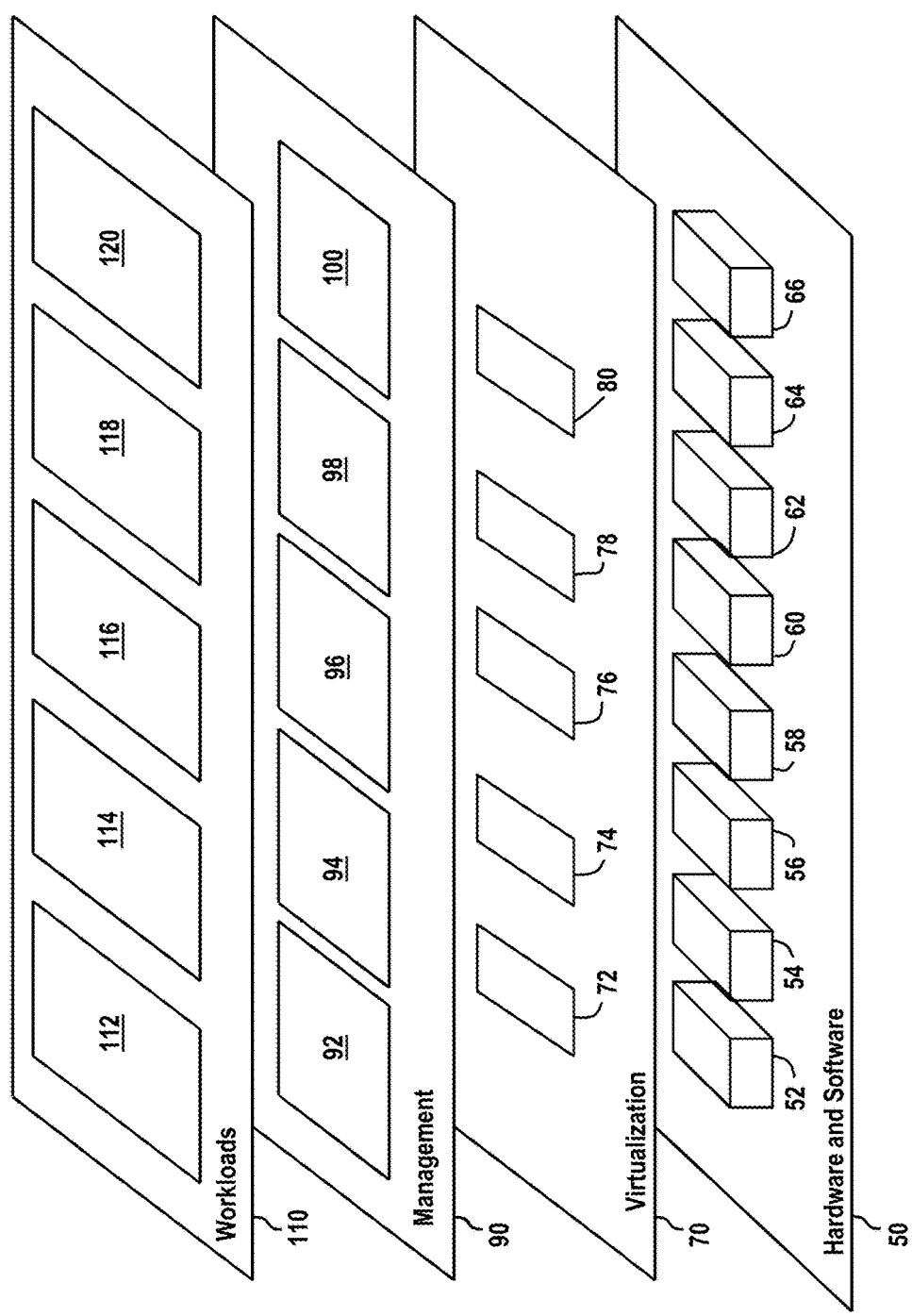
FIG. 2 is an illustration of abstraction model layers for the system of FIG. 1 according to an embodiment of the invention.

Referring now to FIG. 2, a set of functional abstraction layers provided by communications network 31 is shown. It should be understood in advance that the components, layers, and functions shown in FIG. 2 are intended to be illustrative only and embodiments of the invention are not limited thereto. As depicted, the following layers and corresponding functions are provided: a hardware layer 50; a virtualization layer 70; a management layer 90; and a workload layer 110.

Hardware and software layer 60 includes hardware and software components. Examples of hardware components include: mainframes 52; RISC (Reduced Instruction Set Computer) architecture based servers 54; servers 56; blade servers 58; storage devices 60; and networks and networking components 62. In some embodiments, software components include network application server software 64 and database software 66.

The virtualization layer 70 provides an abstraction layer from which the following examples of virtual entities may be provided: virtual servers 72; virtual storage 74; virtual networks 76, including virtual private networks; virtual applications and operating systems 78; and virtual clients 80.

In one example, management layer 90 may provide the functions described below. Resource provisioning 92 provides dynamic procurement of computing resources and other resources that are utilized to perform tasks within the communications network 31. Metering and Pricing 94 provide cost tracking as resources are utilized within the communications network 31, and billing or invoicing for consumption of these resources. In one example, these resources may comprise application software licenses for the remote locations 22, 24, 26 or the mobile devices 38, 40, 42. Security provides identity verification for lower level users and high level users connected to the application server 30, as well as protection for data and other resources. User portal 96 provides access to the communications network 31 for users and system administrators. Service level management 98 provides communications network 31 resource allocation and management such that required service levels are met. Service Level Agreement (SLA) planning and fulfillment 100 provides pre-arrangement for, and procurement of, communications network 31 resources for which a future requirement is anticipated in accordance with an SLA.

Workloads layer 110 provides examples of functionality for which the communications network 31 environment may be utilized. Examples of workloads and functions which may be provided from this layer include: the management of device product information 112; management of device prices and promotions 114; management of data collected from devices 116; data analytics processing 118; transaction processing 120 and inventory management.

As discussed in more detail here, the application server 30 and the mobile devices 38, 40, 42 cooperate to provide updated information to the devices for use by customers within the retail locations 22, 24, 26. In an embodiment, the application server 30 and mobile devices 38, 40, 42 further cooperate to collect and aggregate information about how customers at the remote locations 22, 24, 26 interact with the mobile devices 38, 40, 42. It should be appreciated that this arrangement provides advantages in ensuring that the product information, including pricing and promotional data, for a particular device at a particular location is correct. Further advantages are gained in that usage and popularity information for the mobile devices may be determined on localized level to allow retailers or device manufacturers to make pricing and promotional decisions, such as when combined with other data including inventory for example, based on the preferences of customers where their retail locations are situated.

Figure 3:
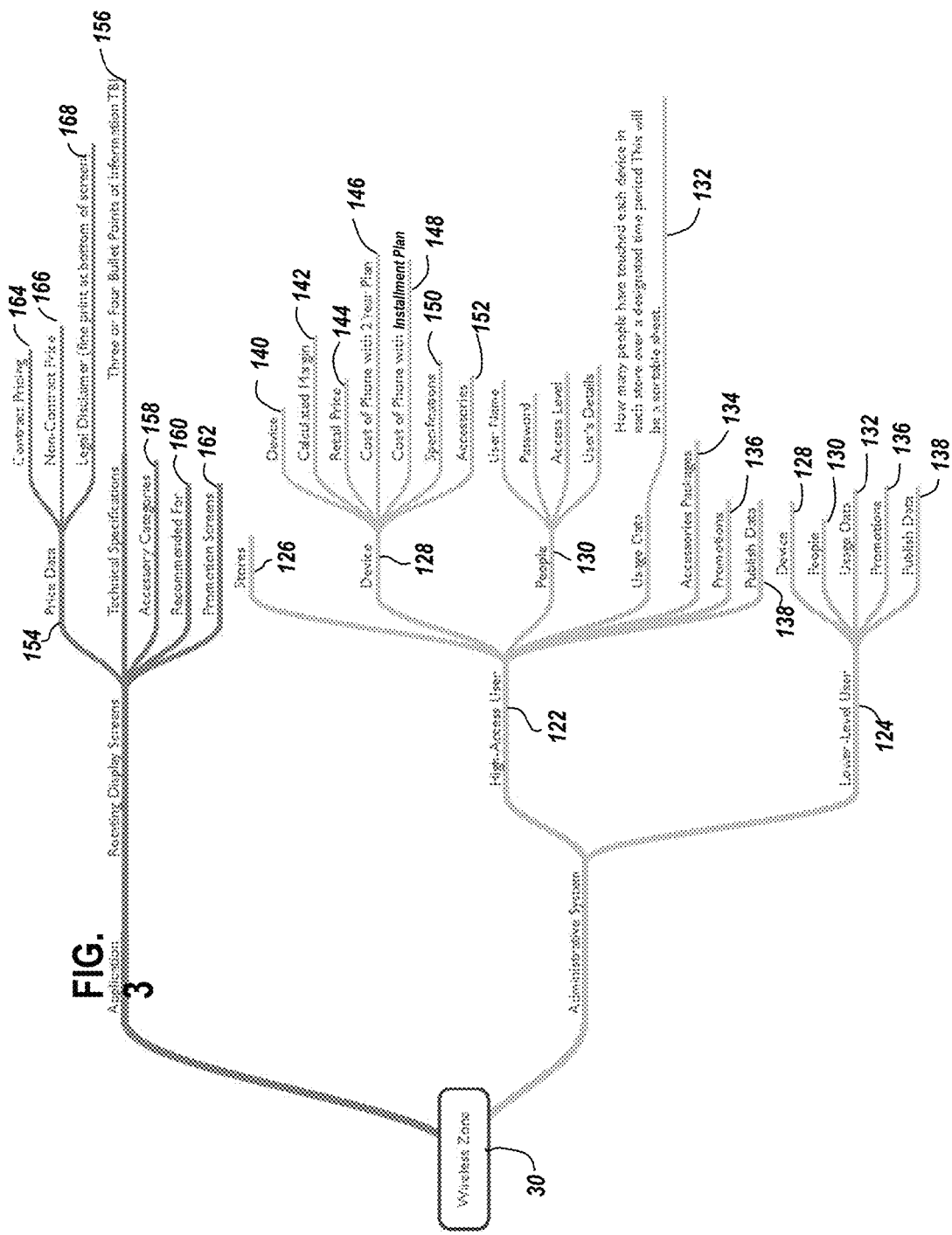
FIG. 3 is a data flow diagram for the system of FIG. 1 in accordance with an embodiment of the invention.

Referring now to FIG. 3 a data flow diagram is illustrated showing an example of the information and data that is transmitted to the mobile devices 38, 40, 42 and to the user. In the exemplary embodiment, the system 20 includes two levels of users, a high level user 122 and a low level user 124. The high level user 122, such as an administrator at a central corporate location for example, can receive and edit information such as the stores data 126 of the retail locations in the system 20, the device data 128, user data 130, usage data 132, device accessories data 134, promotions data 136 and published data 138. The device data 128 may include device data 140, margin retail data 142, price data 144, phone cost with 2 year contract data 146, phone cost with an installment plan data 148, specifications data 150 and compatible accessories 152. The user data may include data typically used with a user account, such as username, password, access level and user details (e.g. location, contact information). As used herein, the term "published data" includes data about the mobile device other than that provided by the device manufacturer, such as who the device is recommended for and narrative product descriptions for example.

It should be appreciated that the lower lever user 124 has less privileges than the high level user to access data. In one embodiment, the lower level user 124 may only retrieve information and not edit it. In the exemplary embodiment, the lower level user 124 may access device data 128, people data 130, usage data 132, promotions data 136 and publish data 138.

The application server 30 is further configured for transmitting, sometimes referred to as "pushing," data to the mobile devices 38, 40, 42. The transmitting of data to the mobile devices may be accomplished using any known methodology known in the art. In the exemplary embodiment, the application server 30 transmits a data package to all of the mobile devices 38, 40, 42 that are connected to the communications network 31. The data package includes data for a plurality of types of mobile devices. It should be appreciated that a plurality of types of mobile devices may be on display within a retail location. For example, the device 38*a* may be a first model of cellular phone, the device 38*b* a second model of cellular phone and the device 38*e* a tablet computer. As discussed in more detail herein, each of the mobile devices 38, 40, 42 may receive the data package and parse the data from the packet that is applicable to that particular devices model or type. As used herein, the term "data package: means a data file that includes multiple data sets, where each data set includes information or data on a single mobile device type. As used herein, a "data set" refers to a group or collection of related data or information (e.g. device specifications).

It should be appreciated that while the exemplary embodiment describes the transmission of data from the application server 30 to the mobile devices 38, 40, 42 in a particular manner as a data package, this is for example purposes and the claimed invention should not be so limited. In one embodiment, the application server 30 transmits data to the servers 28*a*, 28*b*, 28*c* at the retail locations 22, 24, 26. The servers 28*a*, 28*b*, 28*c* then distribute or update the data stored on the mobile devices at that location. For example, the server 28*a* then distributes the data to mobile device 38*a*-38*e*. In another embodiment, each mobile device 38, 40, 42 has an individual address location and that address is stored on the application server 30. The application server 30 may then transmit the data directly to the desired mobile device. For example, the application server 30 may update mobile device 40*d* or mobile device 42*b* individually without updating the remaining mobile devices connected to the communication network 31.

As shown in FIG. 3, the data that may be transmitted to the mobile devices 38, 40, 42 may include any information related to the particular device that a potential customer may find useful or informative in making a decision to purchase the device. In one embodiment, the data transmitted to the mobile devices 38, 40, 42 includes price data 154, technical specifications 156, accessory categories 158, recommended buyer types 160 and promotional data 162. The price data 154 may include a plurality of data, including contract price data 164 (the customer's price if they agree to keep the device for a period of time), a non-contract price data 166, and legal disclaimer data 168.

Figure 4:
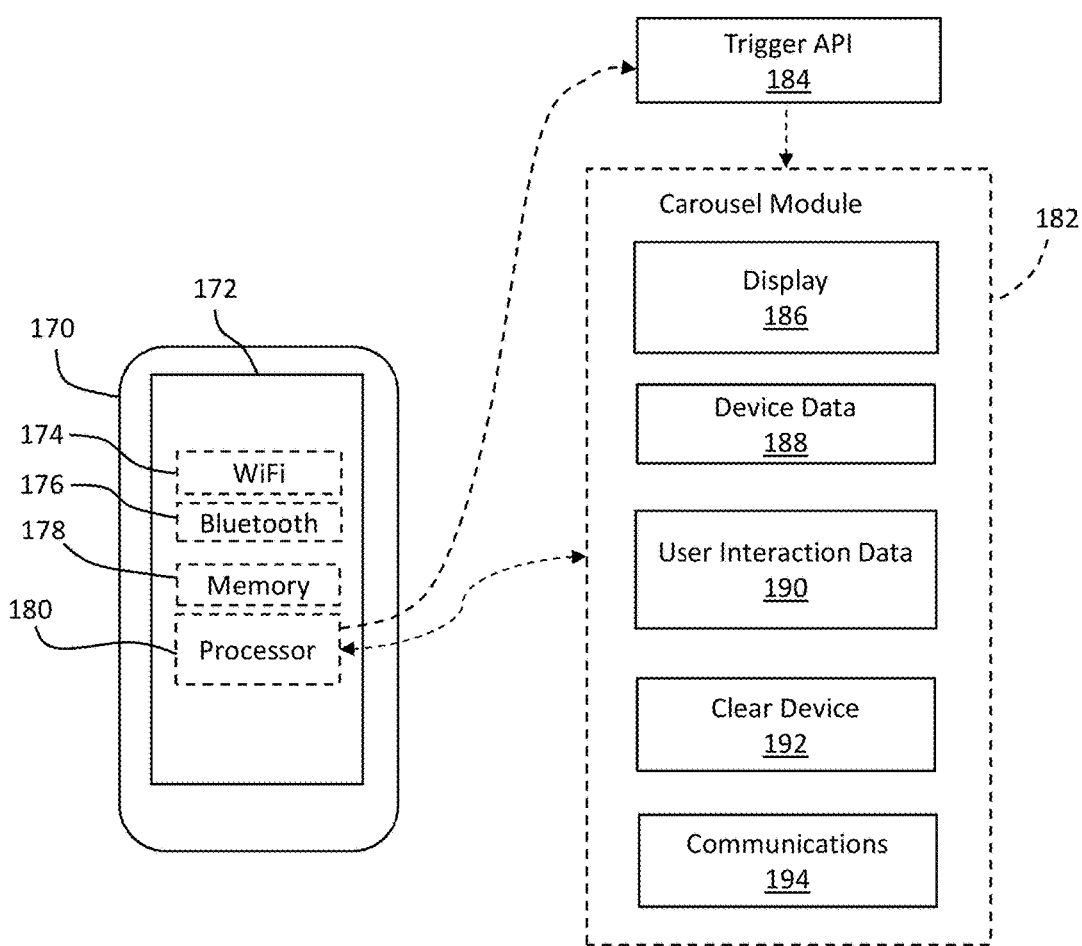
FIG. 4 is a schematic illustration of a mobile device that may be used with the system of FIG. 1 in accordance with an embodiment of the invention.

Referring now to FIG. 4, an embodiment of a mobile device 170 is shown that cooperates with the application server 30 to receive and display information about the mobile device, record information about a potential customer's interaction with the mobile device, and transmits data to the application server 30 on a periodic basis. It should be appreciated that while the mobile device illustrated in FIG. 4 resembles a cellular phone or a computer tablet, the claimed invention should not be so limited.

Figure 11:

In the exemplary embodiment, the mobile device 170 includes a display 172 that presents a graphical user interface (GUI) 200 (FIG. 5) to the user. The GUI 200 may be used to display information about the mobile device 170, including but not limited to pricing information 202 (FIG. 6), device specifications 204 (FIG. 7), recommended buyers 206 (FIG. 8), accessories 208 (FIG. 9) and promotional offers 210 (FIG. 11). In an embodiment, the display 172 is a touch screen device that allows the user to input information and control the operation of the mobile device 170 using their fingers. The mobile device 170 further includes a processor 180 that is responsive to executable computer instructions and to perform functions or control methods, such as those illustrated in FIGS. 18 and 19 for example. The mobile device 170 further includes memory 178, such as random access memory (RAM) or read-only memory (ROM) for example, for storing application code that is executed on the processor 180 and storing data, such as user interaction data for example. The mobile device 180 further includes communications circuits, such as WiFi (IEEE 802.11) circuit 174 and a Bluetooth (IEEE 802.15.1 or its successors) circuit 176 for example. The communications circuits 174, 176 are transceivers, meaning that each is capable of transmitting and receiving signals. It should be appreciated that the mobile device 170 may include additional components and circuits, such as a cellular communications circuit, as is known in the art.

The mobile device 170 may further include additional modules or engines 182, which may be in the form of application software (sometimes colloquially referred to as "apps") that execute on processor 180 and may be stored in memory 178. In one embodiment, a trigger module 184 is provided that initiates an action by the mobile device 170 in response to receiving an external signal, such as a signal from the application server 30 for example. The activation of the trigger module 184 may cause the mobile device 170 to receive, store and parse a data package and activate a carousel module 182 for example.

In one embodiment, the mobile device 170 includes a carousel module 182 that includes submodules that retrieve product information 188 from memory 178, displays the product information 186 on the screen 172, records a potential customer's interaction 190 with the mobile device, performs system maintenance 192 and communicates with the application server 194. As will be discussed in more detail below, information is displayed on the carousel module 182 to a potential customer in a retail location 22, 24, 26 and provides advantages in being remotely updated and thus avoiding the regular replacement of paper or hardcopy product information on the retail display shelf.

Referring now to FIGS. 5-11, an embodiment is shown of the operation of the carousel module 182 on the mobile device 170. In an embodiment, the carousel module 182 may be activated in one of two ways. First, the potential customer may activate the carousel module 182 through the GUI 200, such as by selecting an icon 212. The second means of activation may occur after a period of inactivity on the mobile device 170. For example, the carousel module 182 may be configured to automatically activate after the expiration of the predetermined amount of time. After a predetermined amount of time (e.g. 2 minutes), the carousel module 182 automatically activates.

In an embodiment, the carousel module 182 rotates through a plurality of screens, each having a different set of information that would be relevant to a potential customer. As used herein, the phrase "rotate" the screen means to change the information displayed on the mobile device on a periodic or aperiodic basis between a plurality of predetermined displays each having at least a portion thereof containing different information. In the exemplary embodiment, the carousel module 182 starts by displaying the pricing screen 214. The pricing screen 214 may include a first portion 216 that displays the device name (e.g. model name and manufacturer). A pricing information portion 202 that displays different prices based on the option chosen by the buyer. For example, the pricing information portion 202 may include installment price data 218, a contract price data 220 and a full retail price data 222. The pricing screen 214 may further include a legal disclaimer portion 224 that explains limitations on the quoted pricing.

On each of the screens displayed by the carousel module 182, a set of virtual buttons may be arranged on the screen 172. These buttons may include a forward button 226, a back button 228 and a view phone button 230. The view phone button 230 exits the carousel module 182 and returns the potential buyer to the GUI 200.

Figure 7:
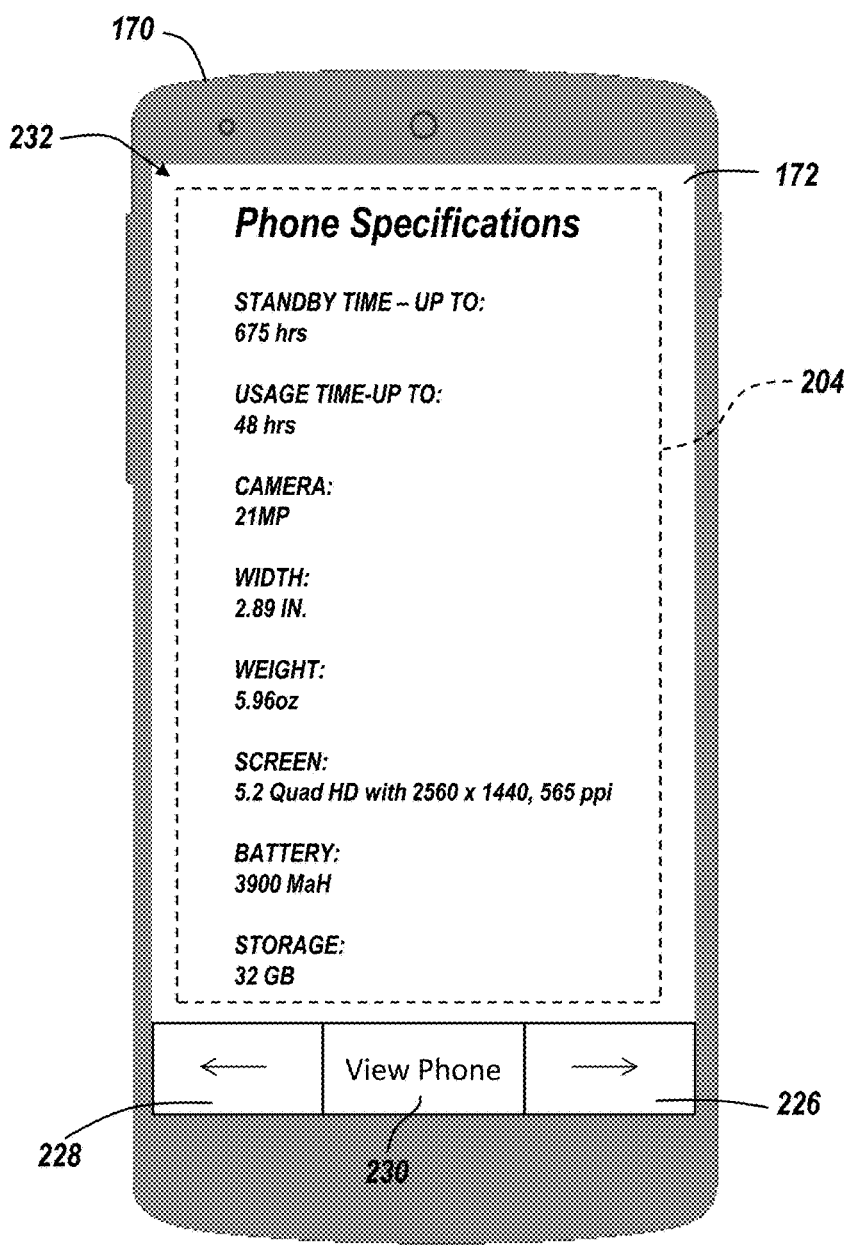

After a first predetermined amount of time (e.g. 20 seconds), the carousel module 182 changes the information displayed on the screen 172 from the pricing screen 214 to the specification screen 232 shown in FIG. 7. It should be appreciated that the amount of time a given screen is displayed may be fixed or variable based on the amount of information that is displayed. For screens having a large amount of information, the display may remain longer than screens that have less information. It should be appreciated that the potential customer may manually change the information displayed on the screen 172 by activating the buttons 226, 228.

The phone specification screen provides the potential customer with technical information about the mobile device 170, such as but not limited to, standby time, usage time, camera size, physical dimensions, screen information, battery size and storage for example. It should be appreciated that the specification screen 232 may be scrollable, meaning that it contains more information that may displayed on the screen 172 at a given time. To see additional information, the potential customer may "scroll" or move information off of the screen (such as by sliding their finger over the screen) to reveal additional information.

Figure 8:
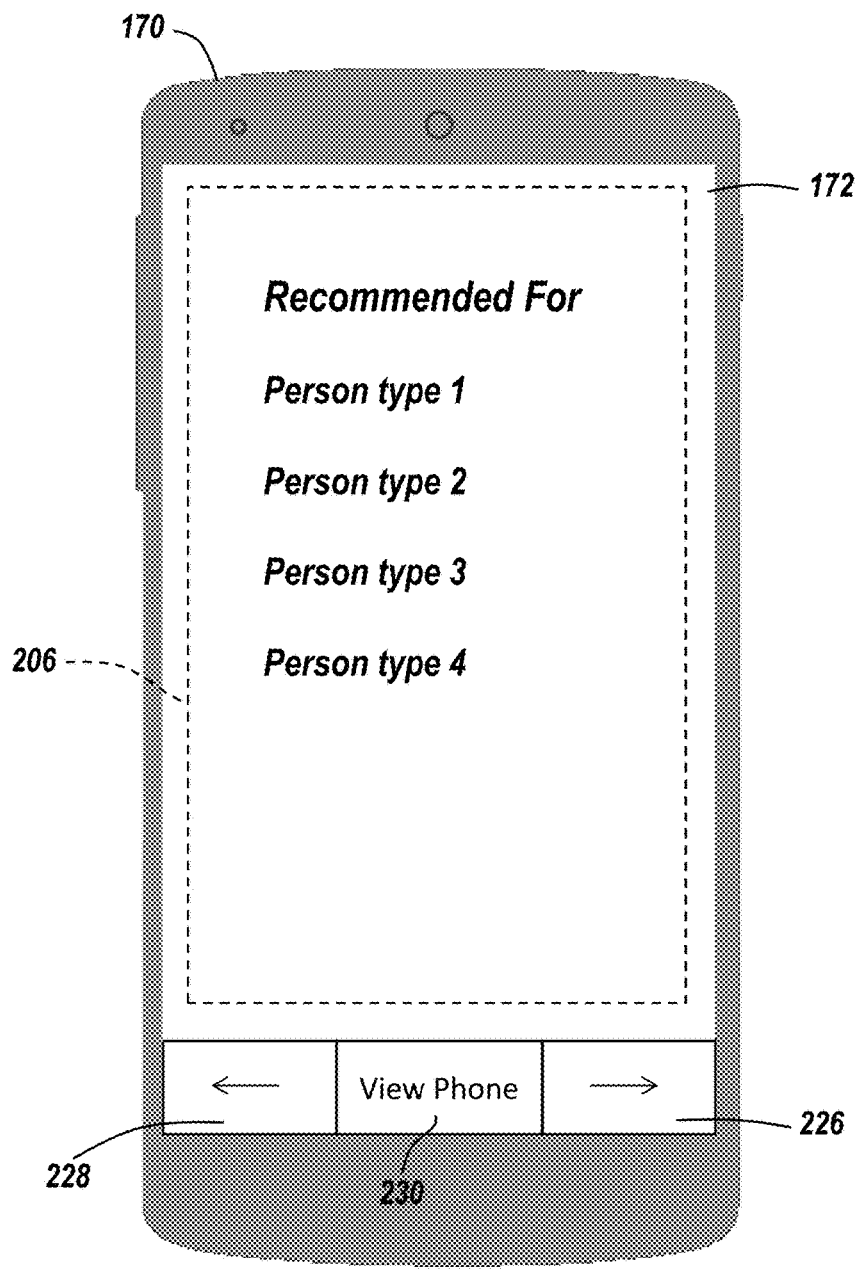

After a second predetermined amount of time, the carousel module 182 changes the information displayed on the screen 172 from the specification screen 232 to the recommended buyers screen 206 shown in FIG. 8. This screen includes qualitative information about the types of people who may enjoy owning this particular model of mobile device. For example, a cellular phone that has a rugged and waterproof case may be recommended to active people, whereas a cellular phone with a large and high definition screen may be recommended for people who view media content on their device.

Figure 9:
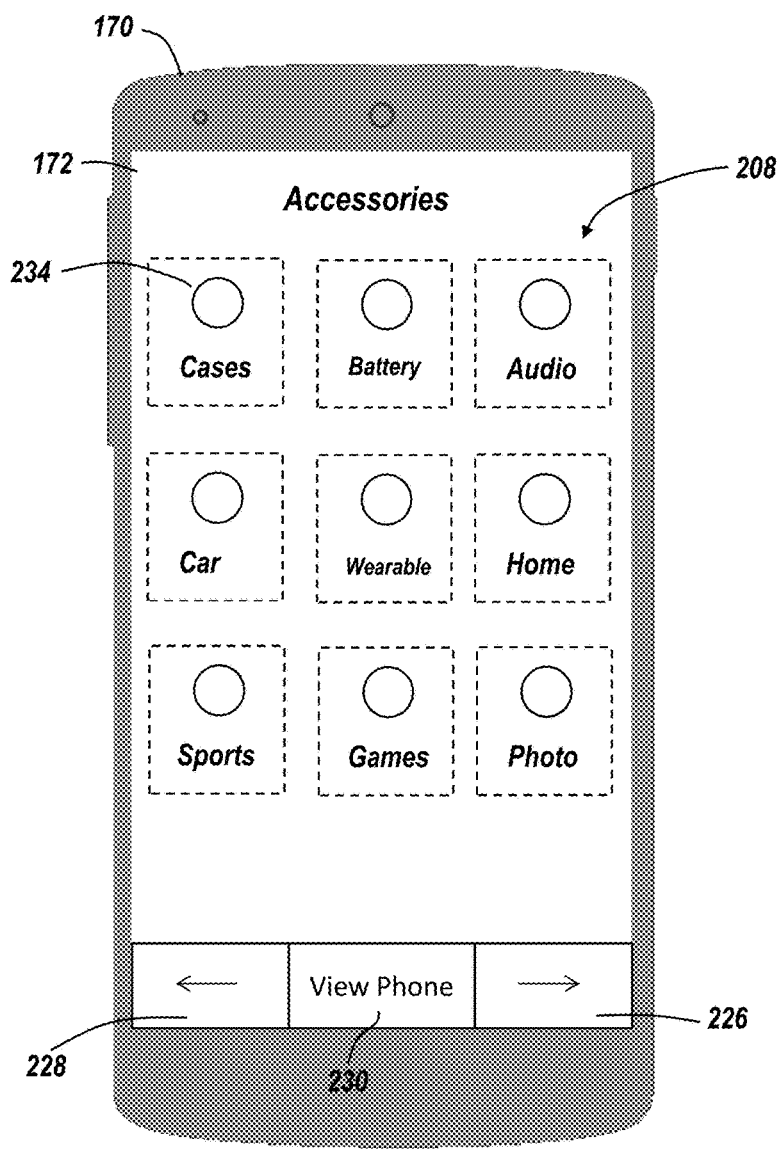
Figure 10:
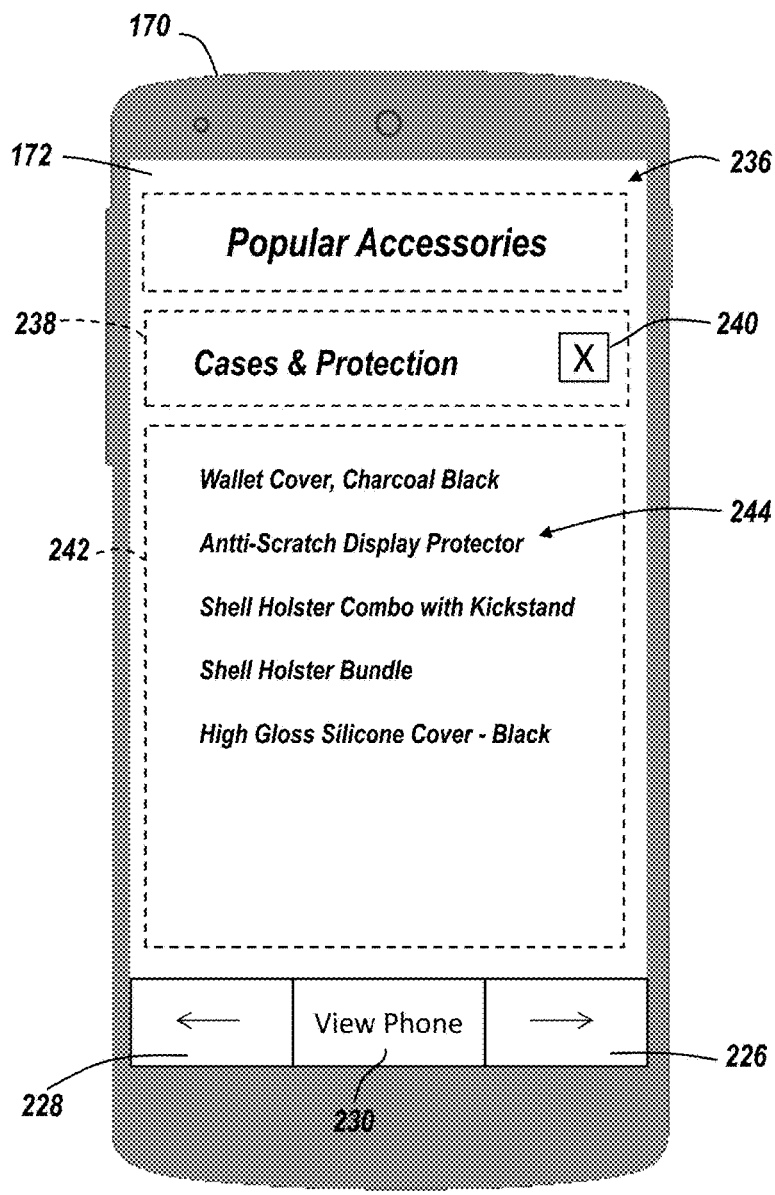

After a third predetermined amount of time, the carousel module 182 changes the information displayed on the screen 172 from the recommended buyers 206 to the accessories screen 208 shown in FIG. 9. The accessories screen 208 includes information on auxiliary and complementary products that may be used with the mobile device. These auxiliary and complementary products may include, but are not limited to, cases and protective products, battery products, audio (e.g. headphone) products, car products (e.g. chargers), wearable products (e.g. watches), home products (e.g. security and home control), sports products (e.g. arm bands) and software such as games and photography.

Each of the categories of auxiliary and complementary products includes an associated element, such as a virtual button 234 for example. When the potential customer selects one of the element associated with a category, the carousel module 182 changes the information displayed to show the products that are available in that category. For example, if the potential customer selects the button 234 associated with the cases element, then the carousel module changes the information displayed on the screen 172 to the associated accessories screen 236 shown in FIG. 10.

The accessories screen 236 includes a first portion 238 that includes a label indicating which accessory is being viewed. Within the first portion 238, a cancel button 240 is provided. By selecting the cancel button 240, the potential customer is returned to the previous screen 208. The accessories screen 236 further includes a second portion 242 that lists the compatible case and protection accessories, such as an anti-scratch protector 244 for example, for this mobile device. In one embodiment, the individual accessories are selectable. In other words, if the accessory label is touched by the potential customer the carousel module 182 changes the screen 172 to display information on that accessory. As will be discussed in more detail below, the accessories listed in the first accessories screen 208 and second accessories screen 236 may be controlled from the application server 30. In this way, the potential customer may be shown the auxiliary and complementary products that are currently available in that retail location.

After a fourth predetermined amount of time (after the accessory screen 208 is displayed), the carousel module 182 changes the information displayed on the screen 172 from the accessories screen 208 to the promotions screen 210 shown in FIG. 11. The promotions screen 210 includes information on any sales or promotional programs being offered for that particular mobile device or to mobile devices in general at that retail location.

Figure 6:
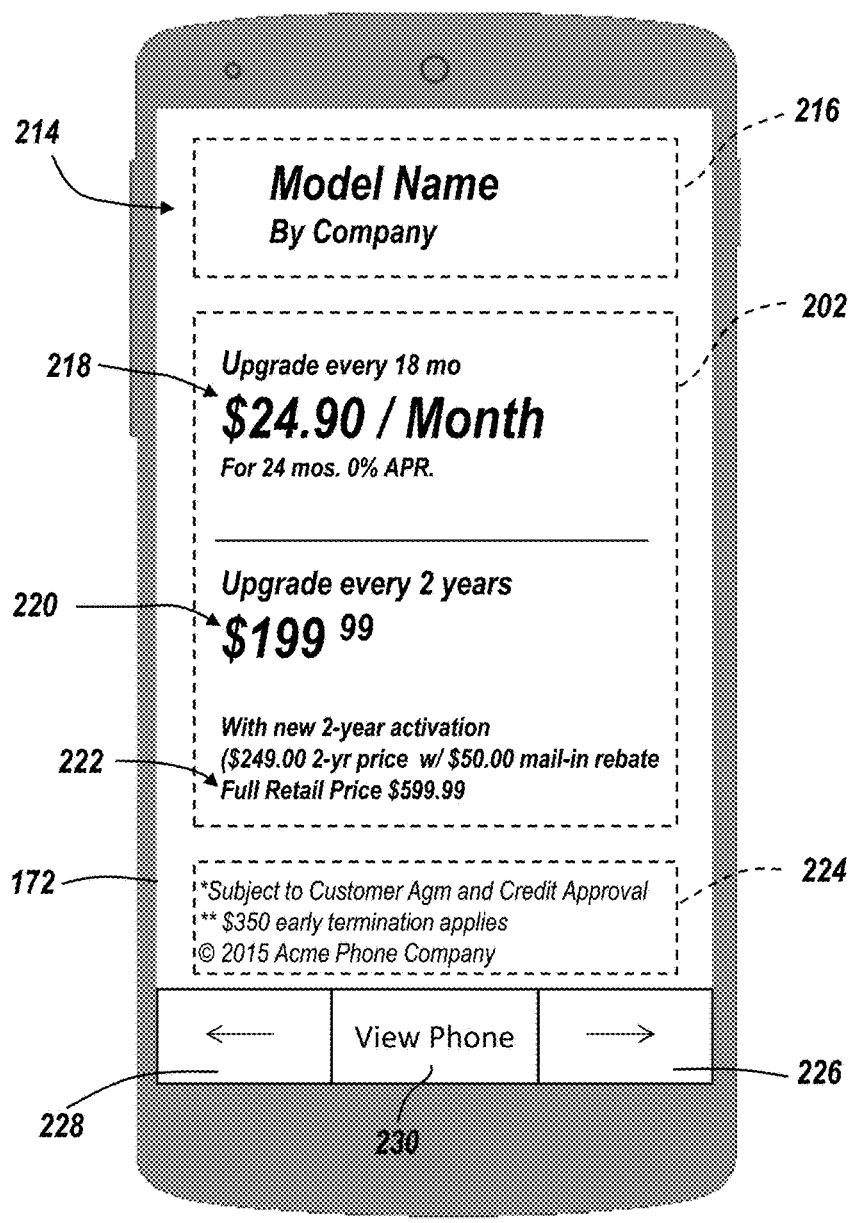

After a fifth predetermined amount of time, the carousel module 182 changes the information displayed on the screen 172 from the promotions screen 210 back to the pricing screen 214 shown in FIG. 6. It should be appreciated that the switching of screens after a time period by the carousel module 182 may be overridden by the potential customer by selecting the buttons 226, 228, 230.

The data and information displayed on screen 172 shown in FIGS. 6-11 is provided from a server, such as application server 30. It should be appreciated that while embodiments herein describe the application server 30 as being coupled through the communications network 31 to a plurality of retail locations 22, 24, 26, this is for exemplary purposes and the claimed invention should not be so limited. In other embodiments, the application server 30 may be located within a single retail location and transmits data and information to the mobile devices within that retail location. In another embodiment, the application server 30 may be located within a retail location (e.g. location 22) and transmits data and information to other retail locations (e.g. locations 24, 26).

Referring now to FIGS. 12-17, a set of screens are shown that are accessible to a high level user for controlling, changing and publishing data and information to the mobile devices 38, 40, 42. The application 250 includes a plurality of tabs 252 that are used for navigating different screens related to the mobile devices 38, 40, 42. The application 250 may be accessed from a computer connected to the application server 30, such as computer 34 for example. In some embodiments, the application 250 may be accessed from any computer capable of connecting to the application server 30 via the communications network 31. The application 250 allows the user to input, modify and publish data and information. This data and information may be stored for later retrieval, such as on storage device 32 as is known in the art.

Figure 12:
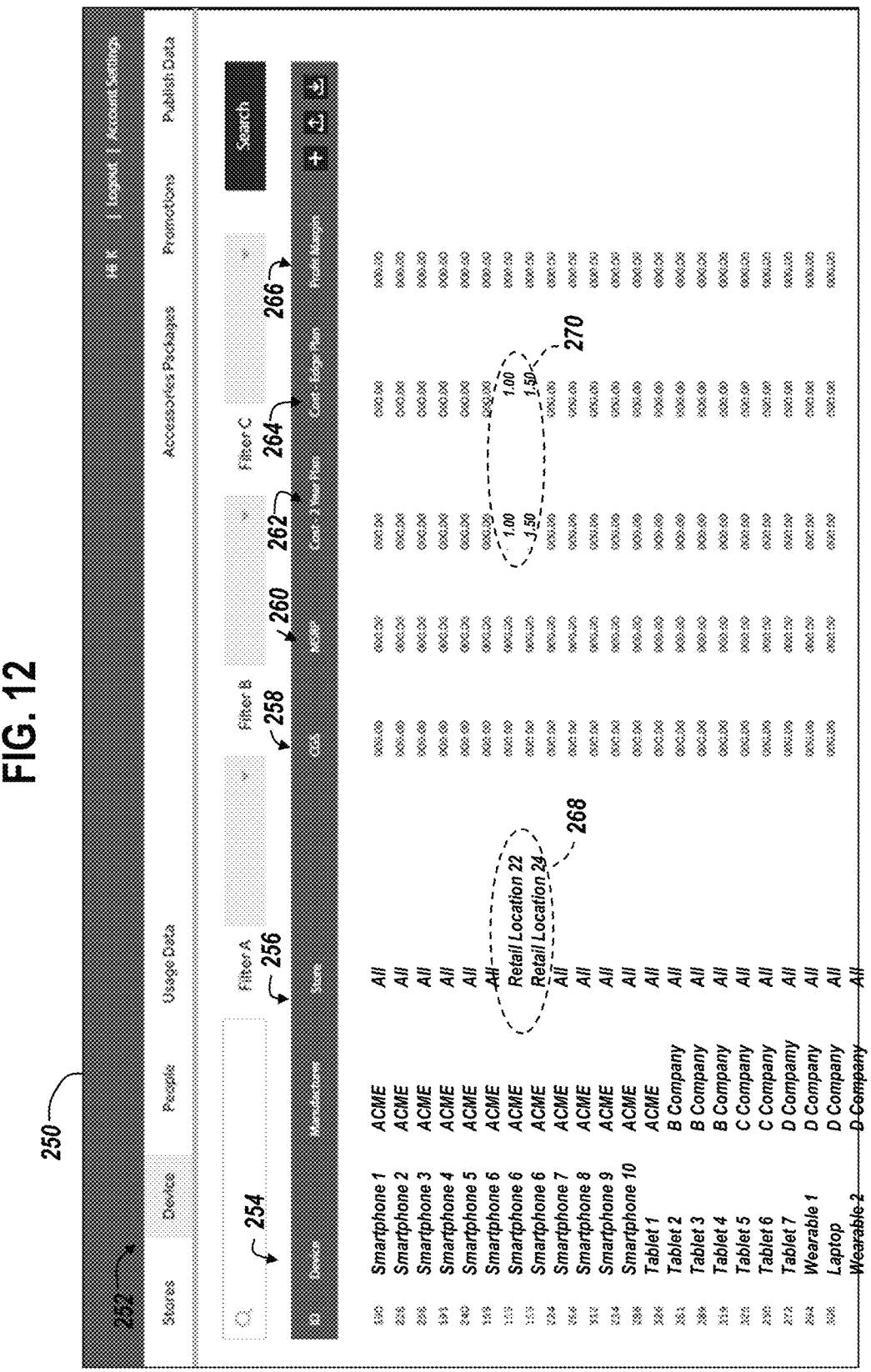
FIGS. 12-17 are illustrations of administration screens for the system of FIG. 1 in accordance with an embodiment of the invention.

As shown in FIG. 12, the application 250 allows the user to see a column 254 listing all of the mobile devices available in the retail locations 22, 24, 26. This listing also shows some limited data, such as which retail locations are selling which products in column 256. Other data shown includes cost of goods sold (CSG) 258, manufacturer's suggested retail price (MSRP) 260, the 2-year contract price 262, the installment plan price 264 and the profit margin 266. In some instances, a particular store location, such as retail location 22 and retail location 24 (shown at location 268), to sell a particular mobile device, such as mobile device 38c and mobile device 40b for example, at a different contract price 262 and installment price 264 (shown generally at 270) than other retail locations. In one embodiment, this price discrimination is made available only to the high level user.

Figure 13:
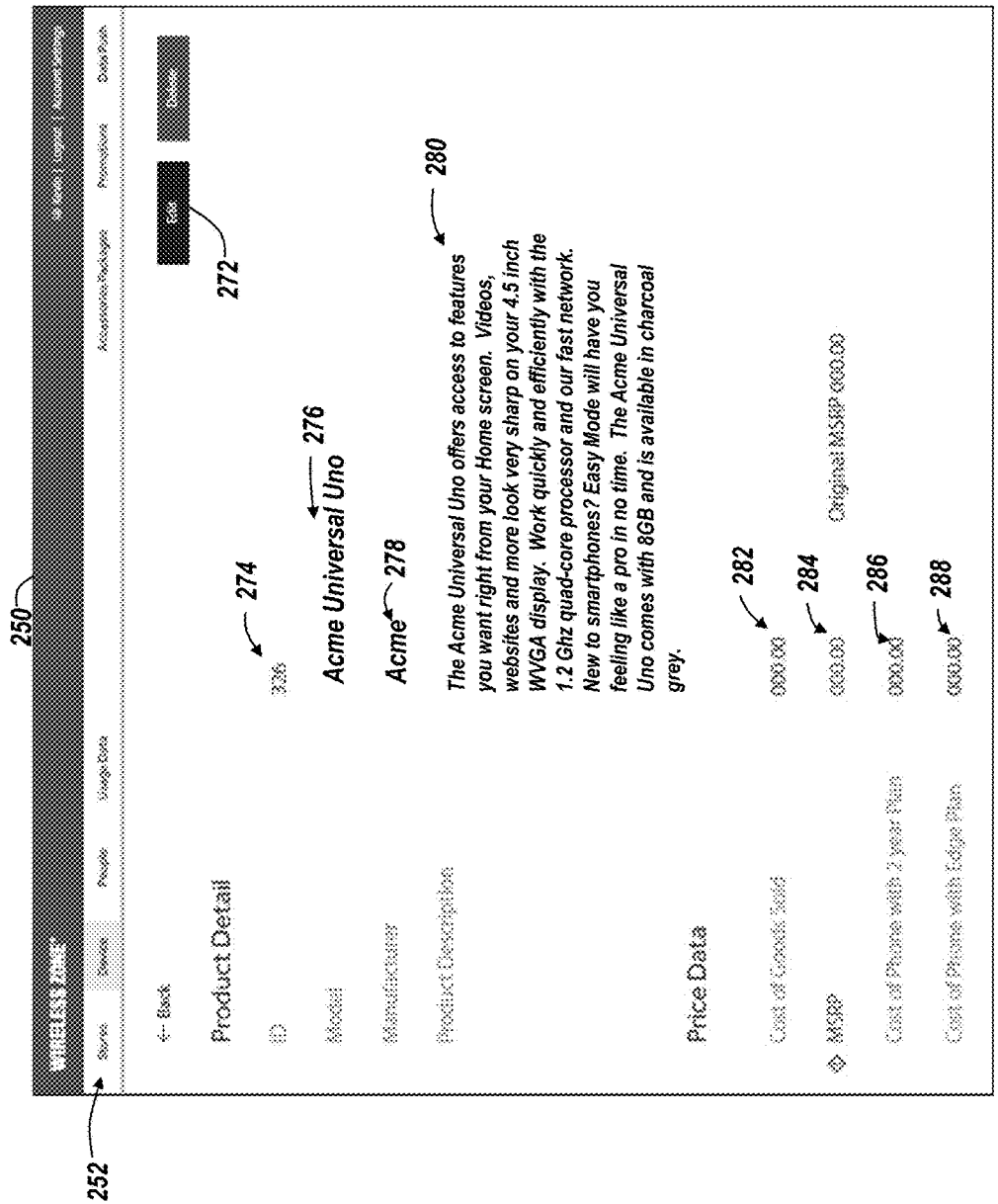
Figure 14:
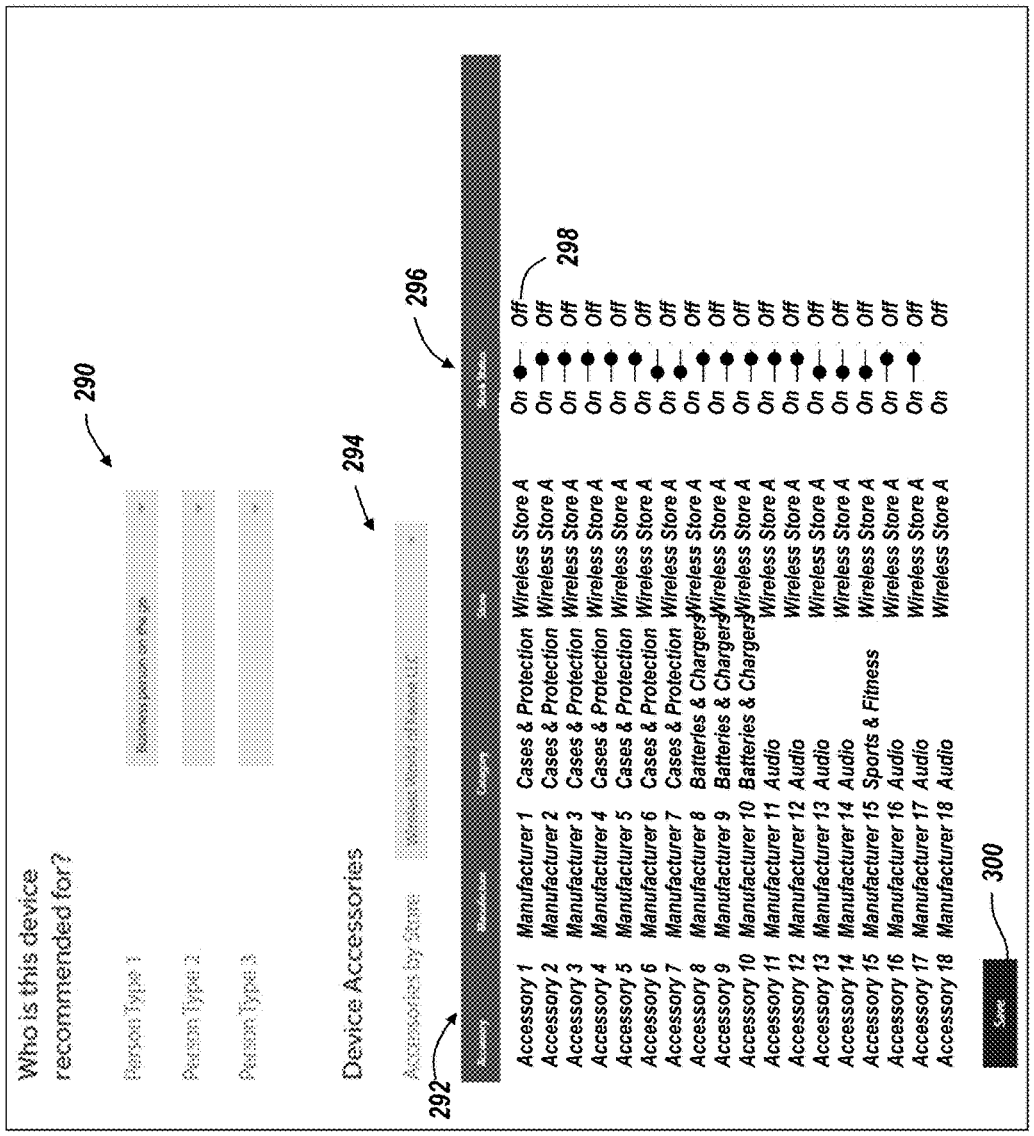

FIG. 13 and FIG. 14 show exemplary device level screen that allows a high level user to modify, save and publish device data. To change data or information, the user selects the edit button 272. Each mobile device will include some basic information, such as a unique device type ID 274, a model name/number 276, a manufacturer 278, a product description 280 and price data. The price data may include the cost of goods sold 282, manufacturer's suggested retail price 284, the contract phone price 286 and the installment plan price 288. It should be appreciated that the ID 274, model number 276, manufacturer 278 and price data 282, 284, 286, 288 are used to populate the lists shown in FIG. 12.

It should be appreciated that device data and information may include any information discussed herein with reference to FIGS. 6-11. In one embodiment, the screen shown in FIG. 13 extends below the bottom of the screen and the user may navigate to other fields by either scrolling (e.g. with a computer mouse) or clicking on a scroll bar as is known in the art. FIG. 14 shows the bottom portion of the screen (meaning scrolled down to the bottom) and illustrates several fields, such as the recommendations person type field 290 and the device accessories list 292. The list of accessories may be shown on a retail location level using drop down control 294. In one embodiment, for each retail location a particular accessory may be flagged as available or unavailable 296 based on whether a product is in stock at that retail location. A user may make the accessory available or unavailable by toggling a virtual switch 298.

Once the data and information for a device is modified to the satisfaction of the user, the user selects a save button 300 that saves the device data and information to storage device 32. Once the device data is saved, the application 250 may be configured to either immediately transmit the updated data via the communications network 31 or transmit the data on a periodic or aperiodic basis. The transmission of device data may be performed automatically (e.g. on a predetermined schedule) or in response to an input by the user.

In one embodiment, the one or more users of the system may have privileges that allow them to override or prevent one or more of the data or information from being transmitted to the devices or devices at identified locations. In one embodiment a user, such as a user at the retail location 22 for example, may be able to override one or more parameters associated with the mobile devices 38c. The local user may be a store manager for example. When a user performs an override, the updated data and information from storage device 32 is not displayed on the mobile device 38c. For example, the user may desire to maintain a particular price for the mobile device 38c such that when the price data 284, 286, 288 is updated, the price displayed on the mobile device 38c remains the same. In this embodiment, the price data is only updated on the same device at other locations (e.g. mobile device 40c and mobile device 42c) will display the new price.

In another embodiment, one or more users may have an additional privilege for changing one or more parameters associated with the mobile devices. Similar to the override function discussed above, in this embodiment the user can define a parameter, such as price for example, that is only displayed on the mobile devices at a particular location, a subset of that location, or on particular devices (e.g. open box or display devices) in the location. In an embodiment, when a user, such as a local user, overrides the parameters for a mobile device, a signal or message is transmitted to an administrative user. The administrative user may either allow the changed parameter (e.g. new price), or change it back to the default. The administrative user may be a local user (e.g. a retail store manager or owner) or a user at a central location (e.g. a centralized corporate location).

The application 250 is further configured to give the user the information about the activities of potential customers in the retail locations 22, 24, 26. In the exemplary embodiment, the mobile devices 38, 40, 42 are configured to record when a potential customer performs an action on the mobile device. In this embodiment, the mobile device records when a potential customer touches the screen, such as to move between the screens 214, 232, 206, 208, 236, 210 for example, or when the application 212 is activated on the mobile device. Each of these actions or "touches" is recorded and used as an indicator of customer interest in the device. It should be appreciated that products that are more popular will be handled and examined by more customers and thus will record a greater number of touches. Thus, by aggregating the number of touches, the system 20 can provide an indication of the popularity of different mobile devices to the user. It should be appreciated that the interaction data recorded may include additional information than how many times the user touched the screen. In some embodiments, the interaction data recorded may include, but is not limited to, when the screen was touched or activated, which screens were activated, the time of day, the day of the week, the amount of time the user spent trying the phones features, and the amount of time spent reading each screen for example.

Figure 15:
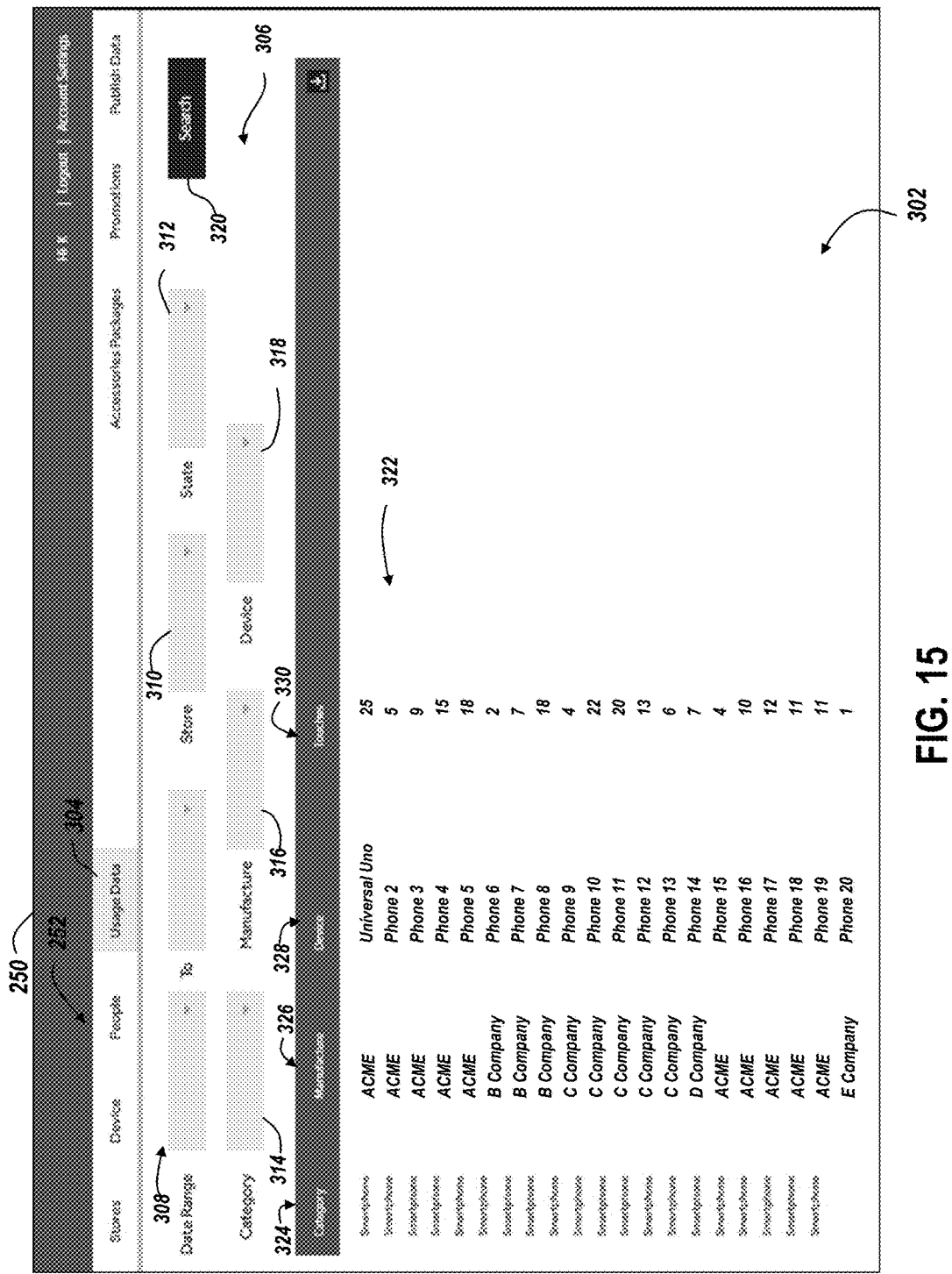
Figure 16:
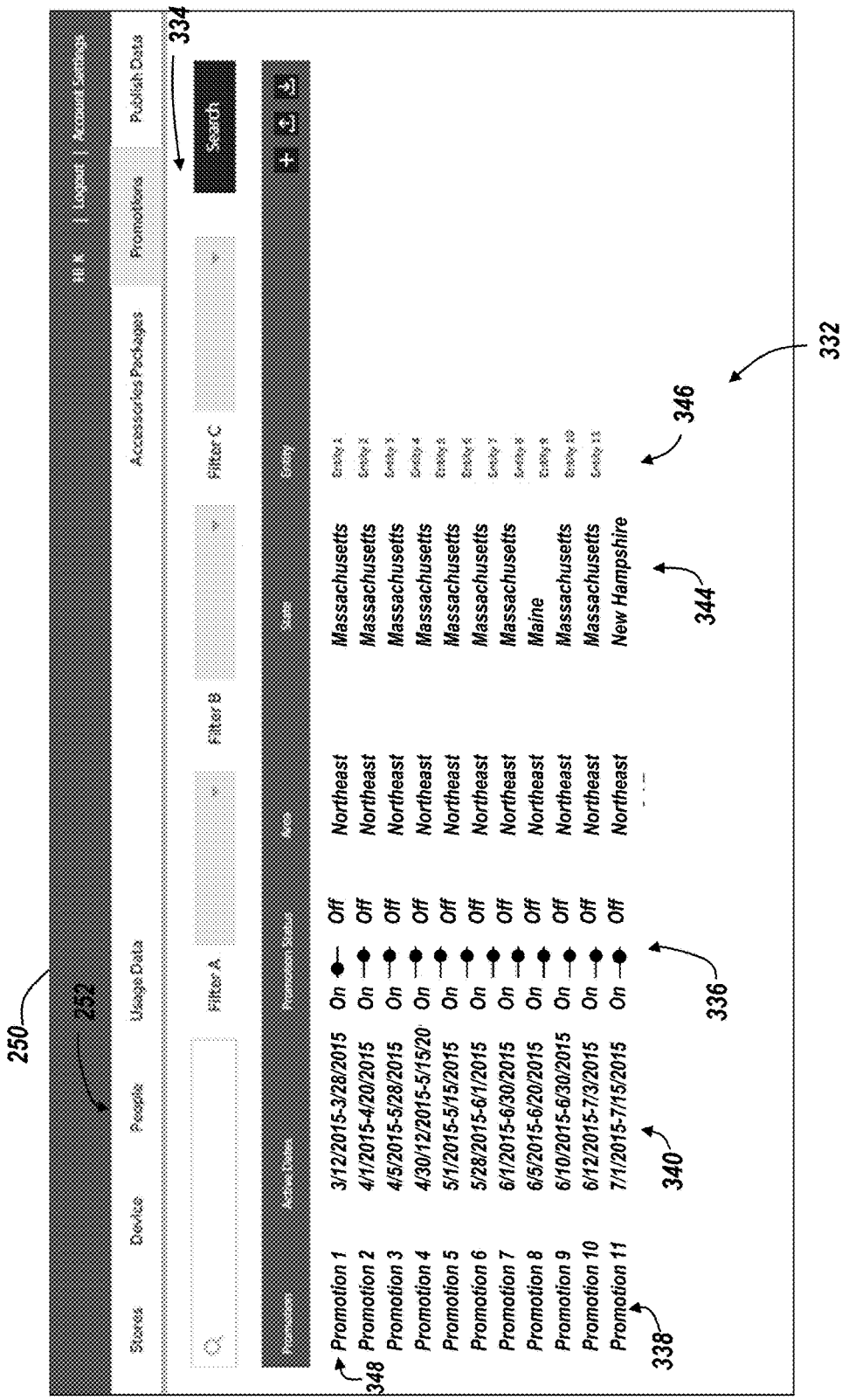

The application 250 includes an analysis screen 302 that is access by the user selecting the Usage Data tab 304 shown in FIG. 15. The screen 302 includes an input section 306 that includes a number of parameters for sorting and filtering the aggregated data. These parameters can include a date range 308, a store selection 310, a state selection 312, a category selection 314 (e.g. cellular phone, tablet, wearable or laptop), a manufacturer selection 316 and a device/model selection 318. Once the user selects the desired criteria from the parameters available and the search button 320 is selected, the application 250 generates a list of data 322 that is suitable for the criteria selected. The data list 322 may include the device type category 324, the manufacturer 326, the model of the device 328 and the aggregated potential customer data 330. From the screen 302, the user can identify trends (e.g. popular manufacturers or popular devices) within the retail locations 22, 24, 26 in the system 20.

As discussed above with reference to FIG. 11, the system 20 allows the mobile devices 38, 40, 42 to display sales or promotional programs being offered at a retail location. To configure the system 20 for providing this display, the application 250 includes a screen 332 shown in FIG. 16.

Similar to FIG. 15, the screen 332 includes an input section 334 that allows the user to filter the results displayed. The filtering parameters can include the promotion type 338, a date range 340 promotions are active, the area 342 the promotions are available, the state 344 in which the promotions are available and the individual retail locations 346 where the promotions are available. In the exemplary embodiment, the user has the option to change the status via a virtual switch 336 that allows a promotional program to be activated or deactivated.

Figure 17:
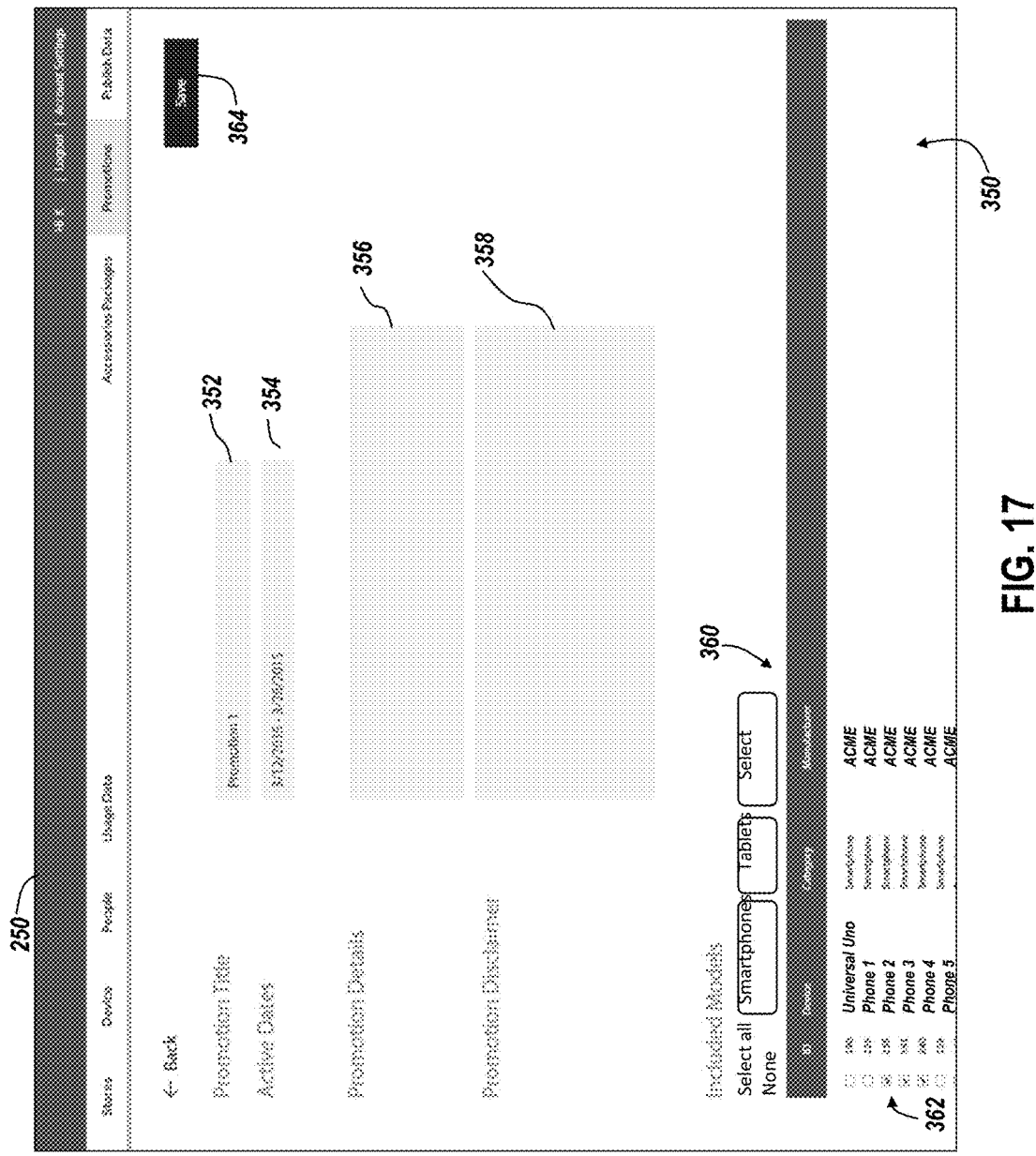

By selecting one of the promotional programs, such as "Promotion 1" 348, the user is brought to a screen 350 shown in FIG. 17. This screen 350 allows the user to change the narrative information displayed on the mobile device regarding the promotional program. In one embodiment, the fields that the user may change or modify include, but are not limited to, the promotion title 352, the date range 354 when the promotional program is active, the promotion details 356 and the promotion disclaimer 358. The screen 350 further includes a device section 360 where user may further select which mobile devices are included in the promotional program. In one embodiment, the application 250 provides the list of devices and the user selects a check box 362 to add or remove a particular mobile device from the promotional program. Once the user is satisfied with the information on screen 350, the save button 364 is selected to save the data to the storage device 32.

Figure 18:
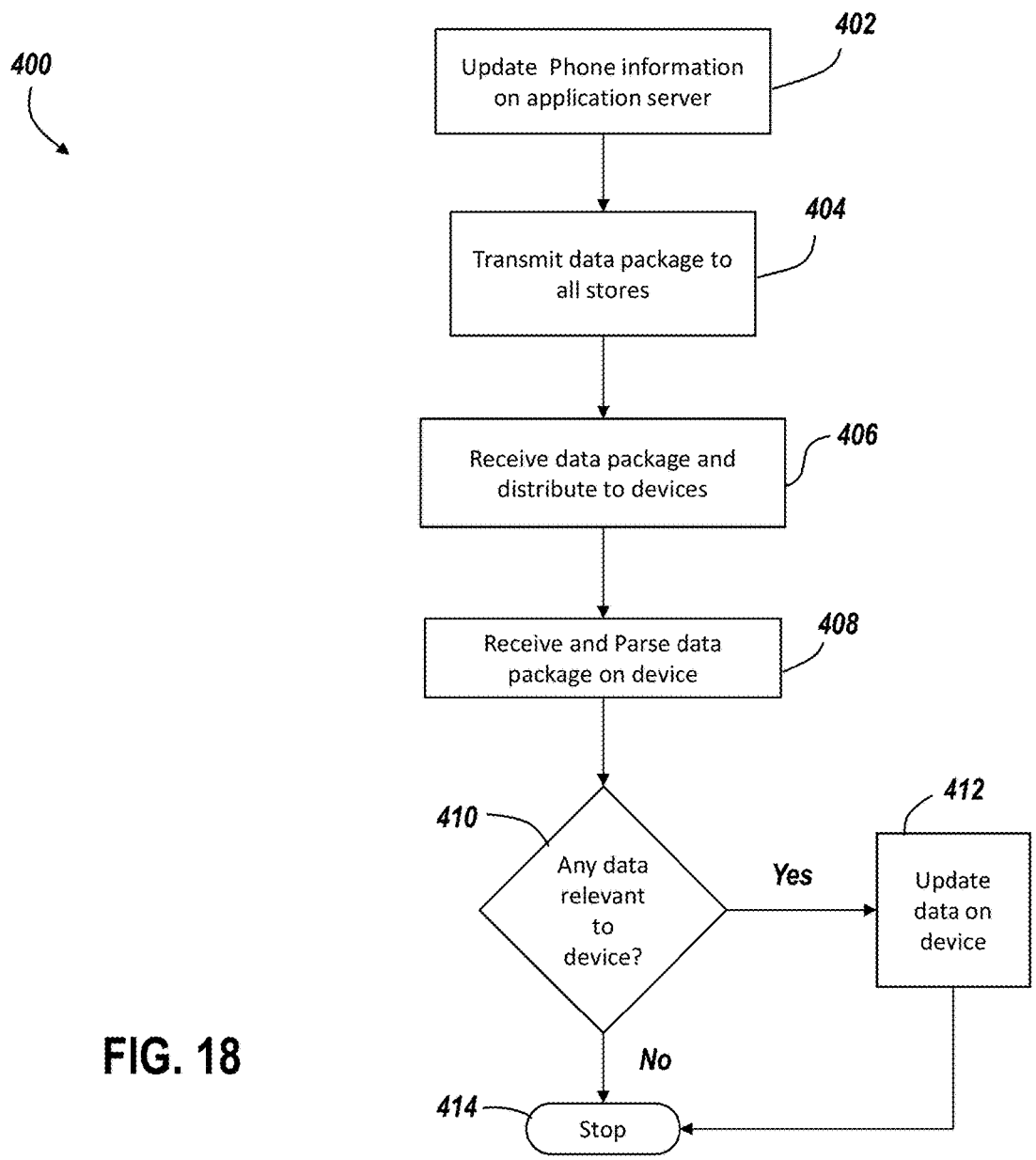
FIG. 18 is a flow diagram for a method of updating information on a mobile device in the system of FIG. 1 in accordance with an embodiment of the invention.

Referring now to FIG. 18, a method 400 is shown for transmitting and updating information displayed on the mobile devices 38, 40, 42 using the system 20. The method 400 starts in block 402 by updating the information about devices, accessories and promotional programs on the application server 30. The method 400 then proceeds to block 404 where the data is transmitted to the mobile devices 38, 40, 42. In an embodiment, the transmission of data is in the form of a single electronic file or data package that including information on multiple mobile devices. In other words the data package will include multiple data sets, such as a first data set directed to a first mobile device and a second data set directed to a second mobile device. The transmission of the data to the mobile devices 38, 40, 42 may occur on a periodic or aperiodic basis. In one embodiment, transmission of data occurs on demand in response to an action by the user.

The method 400 then proceeds to block 406 where the data package is received. In one embodiment, the data package is received by the servers 28a, 28b, 28c at the retail locations 22, 24, 26. In this embodiment, the data package is then distributed by the servers 28a, 28b, 28c to the mobile devices 38, 40, 42. In another embodiment, the data package is transmitted directly to and received by the mobile devices 38, 40, 42 (e.g. via cellular data connections). The method 400 then proceeds to block 408 where each mobile device 38, 40, 42 parses the data within the data package. As discussed herein, the data package may include information on multiple mobile devices, so not all of the data sets within the data package are directed to each mobile device. In query block 410, each mobile device 38, 40, 42 determine if any of the data sets within the data package is relevant to that device (e.g. the data matches the manufacturer, model and retail location of the inspecting device). When query block 410 returns an affirmative, the method 400 proceeds to block 412 where the data on the mobile device is updated such that the next time the carousel module 182 is activated, the new data is displayed. After the data has been updated, or when the query block 410 returns a negative, the method 400 proceeds to stop block 414.

Figure 19:
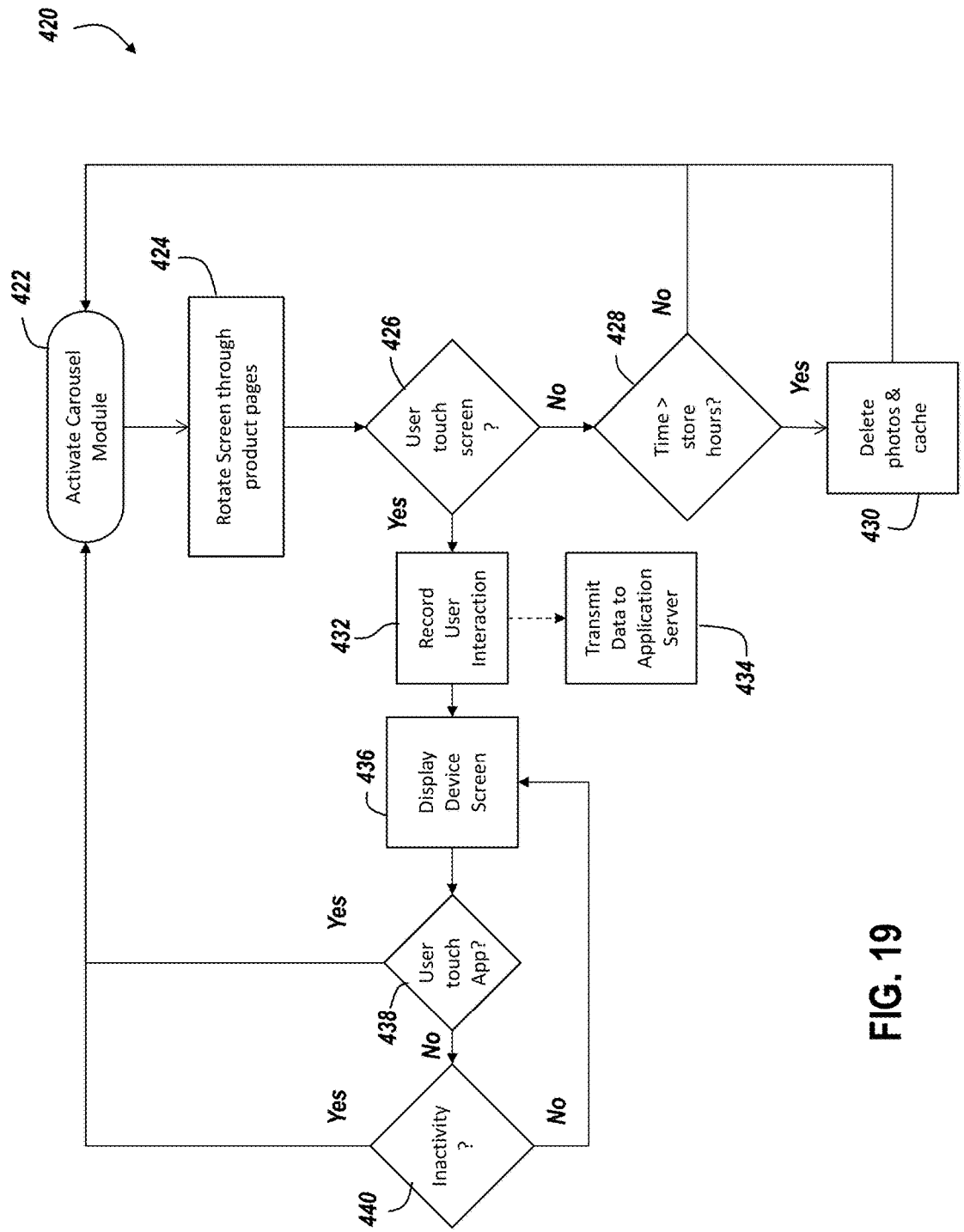
FIG. 19 is a flow diagram for a method operating the mobile device in the system of FIG. 1 in accordance with an embodiment of the invention.

Referring now to FIG. 19, another method 420 is shown for the operation of the mobile devices 38, 40, 42 for displaying product information and aggregating potential customer interaction data. The method 420 starts in block 422 where the carousel module 182 is activated. This activation may occur automatically, such as at a particular time of day (e.g. when the store opens) or when the mobile device is powered into an on-state for example. The method 420 then proceeds to block 424 where the mobile device rotates through the product information screens, such as those shown in FIGS. 6-11 for example. In query block 426, the method 420 determines if a potential customer has touched the screen of the mobile device (or actuated a physical button). If the query block 426 returns a negative, the method 420 proceeds to query block 428 where it is determined if the current time is after a predetermined time of the day (e.g. after the retail location closes). If the query block 428 returns a positive, the method 420 proceeds to block 430 where the mobile devices cache, web page history and photos are cleared from the device. Once the cache, history and photos are cleared, or if query block 428 returns a negative, the method 400 loops back to block 422.

When the query block 426 returns a positive, meaning a potential customer has interacted with the mobile device, the method 420 proceeds to block 432 where the interaction is stored or recorded. The method 420 may then transmit the potential customer interaction data to the application server 30 in block 434. It should be appreciated that the interaction data may be transmitted on a periodic or aperiodic basis. In the exemplary embodiment, the interaction data is queued and a module 190 within the carousel module 182 executes on a periodic basis (e.g. every 10 seconds) to transmit the interaction data to the application server 30.

Figure 5:
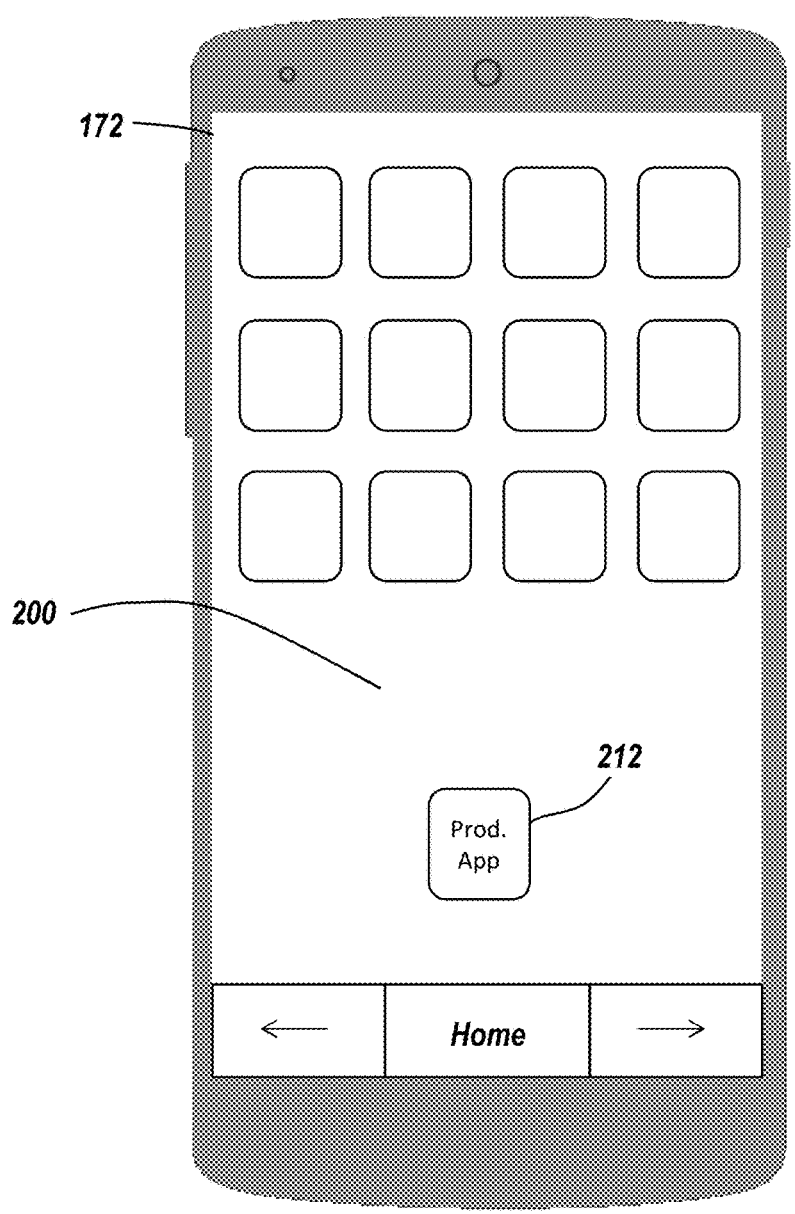
FIGS. 5-11 are illustrations of a mobile device displaying product information in accordance with an embodiment of the invention.

After recording the interaction, the method 420 proceeds to block 436 where the carousel module stops displaying the product information screens and displays the mobile device's "home" screen. This allows the potential customer to use with the mobile device and try different functions. The method 420 then proceeds to query block 438 where it is determined if the user has activated the carousel application 212 (FIG. 5). If the query block 438 returns a positive, then the method 420 loops back to block 422 and the carousel module is activated once again. If the query block 438 returns a negative, then the method 420 proceeds to block 440 where it is determined if a predetermined amount of time (e.g. 2 minutes) has passed since the last activity on the mobile device by the potential customer. If the potential customer has stopped using the mobile device, then the query block 440 returns a positive and the method 420 loops back to block 422 where the carousel module is activated. If the query block 440 returns a negative (the potential customer is still interacting with the mobile device), then the method 420 loops back to block 436.

The technical effects and benefits of embodiments of the invention described herein include providing advantages to product retail sales channels by using the electronic displays of the products, such as mobile devices, for displaying product information. This arrangement allows for the elimination of, or at least reduction of, hardcopy product specification sheets from the retail display shelves. Embodiments provided herein further provide advantages in allowing the updating of product information and promotional program information provided to customers on a real-time or near real-time basis. Embodiments provided herein allow for the restriction of product and promotional program information modification to a centralized server or to certain users. This provides advantaged in a consistency of marketing messaging in remotely located retail locations. Still further advantages may be gained in the collection of potential customer interaction data allowing for analysis of trends and determination of the popularity of products in the retail locations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium may include, but is not limited to: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Throughout the specification and claims, the following terms take the meanings explicitly associated herein, unless the context clearly dictates otherwise. The terms "coupled" or "connected" means either a direct connection between the items connected, or an indirect connection through one or more passive or active intermediary devices. The term "circuit" means either a single component or a multiplicity of components, either active and/or passive, that are coupled together to provide or perform a desired function. The term "signal" means at least one current, voltage, or data signal. The term "module" means a circuit (whether integrated or otherwise), a group of such circuits, a processor(s), a processor(s) implementing software, or a combination of a circuit (whether integrated or otherwise), a group of such circuits, a processor(s) and/or a processor(s) implementing software.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A system comprising:
a server at a first location, the server having a first processor responsive to executable computer instructions when executed on the first processor for receiving an input and transmitting a data package in response to receiving the input, the input including product information; and
a first plurality of mobile devices at a second location, the first plurality of mobile devices comprising user devices that provides interaction data to the server, the second location different from the first location, each of the first plurality of mobile devices having a first display and a second processor, the second processor being coupled to the first display, the second processor being responsive to executable computer instructions for receiving the data package and displaying at least a portion of the product data on the first display in response to receiving the data package, wherein the second processor is further responsive to storing the interaction data in response to a potential customer performing an action on a corresponding mobile device of the first plurality of mobile devices, the interaction data including at least one of when the first display was activated, a time of day, a day of week, and an amount of time a user spent reading the first display.

2. The system of claim 1 further comprising a second plurality of mobile devices at a third location, the third location different from the first location and the second location, the second plurality of mobile devices having a second display and a third processor, the third processor being coupled to the second display, the third processor being responsive to executable computer instructions for receiving the data package and displaying the product information on the second display in response to receiving the data package.

3. The system of claim 1 wherein:
the first plurality of mobile devices includes a first mobile device and a second mobile device, the first mobile device being of a different type than the second mobile device; and
the data package includes a first data set and a second data set, the first data set associated with the first mobile device and the second data set being associated with the second mobile device.

4. The system of claim 3 wherein the first mobile device includes a fourth processor that is responsive to executable computer instructions for parsing the data package and storing in a memory the first data set in response to receiving the data package.

5. The system of claim 4 wherein the first mobile device includes a third display, the fourth processor being responsive for displaying at least a portion of the first data set on the third display in response to storing the first data set in the memory.

6. The system of claim 5 wherein
the first data set includes a first portion and a second portion; and
the fourth processor is further responsive for displaying the first portion on the third display and then displaying the second portion after a predetermined period of time.

7. The system of claim 5 wherein the first data set includes data selected from a group consisting of: price data, contract price data, installment price data, technical specification data, accessory data and promotional program data.

8. The system of claim 1 wherein the second processor is further responsive for transmitting the interaction data to the server on a periodic or aperiodic basis.

9. The system of claim 8 wherein the fourth processor is further responsive for clearing a cache and deleting photos stored on the first mobile device in response to determining a current time is after a predetermined time.

10. A method of displaying product information, the method comprising:
inputting a first data set associated with a first mobile device type;
inputting a second data set associated with a second mobile device type;
storing in a memory the first data set and the second data set;
transmitting the first data set and second data set to a plurality of mobile devices;
receiving at a first mobile device the first data set and the second data set, the first mobile device being the first mobile device type;
receiving at a second mobile device the first data set and the second data set, the second mobile device being the second mobile device type;
displaying on the first mobile device at least a portion of the first data set;
displaying on the second mobile device at least a portion of the second data set;

determining that a potential customer has interacted with the first mobile device; and storing interaction data on the first mobile device when a potential customer interacts with the first mobile device, the interaction data including at least one of when the first display was activated, a time of day, a day of week, and an amount of time a user spent reading the first display.

11. The method of claim 10 wherein the first data set includes a first portion and a second portion.

12. The method of claim 11 further comprising:
displaying on the first mobile device the first portion;
waiting a predetermined amount of time after displaying the first portion; and
displaying on the first mobile device after the predetermined amount of time the second portion.

13. The method of claim 12 further comprising displaying the second portion on the first mobile device prior to the predetermined amount of time in response to receiving an input from a potential customer.

14. The method of claim 12 further comprising:
combining the first data set and the second data set into a data package; and
transmitting the data package to the plurality of mobile devices.

15. The method of claim 14 further comprising:
parsing the data package with the first mobile device; and
storing the first data set on the first mobile device in response to parsing the data package.

16. The method of claim 15 wherein the first data set includes at least one of price data, contract price data, installment price data, technical specification data, accessory data and promotional program data.

17. The method of claim 16 further comprising transmitting on a periodic or aperiodic basis the interaction data to a server, the server being remotely located from the first mobile device.

18. The system of claim 8 wherein the first processor is responsive to displaying parameters based at least in part on the interaction data, the parameters including at least one of a date range, a store selection, a state selection, a category selection, a manufacturer selection and a device selection.

19. The system of claim 1, wherein a carousel module of the first plurality of mobile devices provides the interaction data to the server.

20. The system of claim 19, wherein the carousel module supports popularity determinations comprising analysis of trends from the interaction data to determine product popularity in the second location.

* * * * *